United States Patent
Choi et al.

(10) Patent No.: US 12,472,472 B2
(45) Date of Patent: Nov. 18, 2025

(54) METHOD FOR MAKING POROUS GRAPHENE MEMBRANES AND MEMBRANES PRODUCED USING THE METHOD

(71) Applicant: HeiQ Materials AG, Schlieren (CH)

(72) Inventors: Kyoungjun Choi, Thalwil (CH); Hyung Gyu Park, Seoul (KR); Murray Height, Newtown (AU)

(73) Assignee: HEIQ MATERIALS AG, Schlieren (CH)

( * ) Notice: Subject to any disclaimer, the term of this patent is extended or adjusted under 35 U.S.C. 154(b) by 0 days.

(21) Appl. No.: 17/786,711

(22) PCT Filed: Dec. 1, 2020

(86) PCT No.: PCT/EP2020/084050
§ 371 (c)(1),
(2) Date: Jun. 17, 2022

(87) PCT Pub. No.: WO2021/121952
PCT Pub. Date: Jun. 24, 2021

(65) Prior Publication Data
US 2023/0028773 A1    Jan. 26, 2023

(30) Foreign Application Priority Data
Dec. 19, 2019   (EP) .................................... 19218038

(51) Int. Cl.
*C01B 32/186* (2017.01)
*A41D 31/102* (2019.01)
(Continued)

(52) U.S. Cl.
CPC ........ *B01D 71/0211* (2022.08); *A41D 31/102* (2019.02); *B32B 5/022* (2013.01);
(Continued)

(58) Field of Classification Search
CPC ... B01D 71/0211; A41D 31/102; B32B 5/022; B32B 7/12; B32B 9/007; B32B 9/047;
(Continued)

(56) References Cited

U.S. PATENT DOCUMENTS

2012/0241069 A1   9/2012  Hofmann et al.
2013/0160701 A1   6/2013  Arnold et al.
(Continued)

FOREIGN PATENT DOCUMENTS

CN   102583337 A   7/2012
CN   103241728 A   8/2013
(Continued)

OTHER PUBLICATIONS

Madito, M. J., et al. "A dilute Cu (Ni) alloy for synthesis of large-area Bernal stacked bilayer graphene using atmospheric pressure chemical vapour deposition." Journal of Applied Physics 119.1 (2016).*
(Continued)

*Primary Examiner* — Richard M Rump
(74) *Attorney, Agent, or Firm* — Sughrue Mion, PLLC

(57) ABSTRACT

Provided is a method for making a porous graphene layer of a thickness of less than 100 nm, including the following steps: providing a catalytically active substrate, said catalytically active substrate on its surface being provided with a plurality of catalytically inactive domains having a size essentially corresponding to the size of the pores in the resultant porous graphene layer; and chemical vapour deposition and formation of the porous graphene layer on the surface of the catalytically active substrate. The catalytically active substrate is a copper-nickel alloy substrate with a copper content in the range of 98 to less than 99.96% by weight and a nickel content in the range of more than 0.04-2% by weight, the copper and nickel contents comple-
(Continued)

menting to 100% by weight of the catalytically active substrate.

21 Claims, 13 Drawing Sheets

(51) Int. Cl.
    *B01D 71/02*     (2006.01)
    *B32B 5/02*     (2006.01)
    *B32B 7/12*     (2006.01)
    *B32B 9/00*     (2006.01)
    *B32B 9/04*     (2006.01)
    *B32B 37/12*     (2006.01)
    *C23C 14/16*     (2006.01)
    *C23C 14/30*     (2006.01)
    *C23C 14/34*     (2006.01)
    *C23C 16/02*     (2006.01)
    *C23C 16/26*     (2006.01)
    *C23C 16/56*     (2006.01)

(52) U.S. Cl.
    CPC .............. *B32B 7/12* (2013.01); *B32B 9/007* (2013.01); *B32B 9/047* (2013.01); *B32B 37/12* (2013.01); *C01B 32/186* (2017.08); *C23C 14/165* (2013.01); *C23C 14/30* (2013.01); *C23C 14/34* (2013.01); *C23C 16/0209* (2013.01); *C23C 16/0281* (2013.01); *C23C 16/26* (2013.01); *C23C 16/56* (2013.01); *B32B 2250/02* (2013.01); *B32B 2262/0292* (2013.01); *B32B 2305/026* (2013.01); *B32B 2305/18* (2013.01); *B32B 2307/724* (2013.01); *B32B 2307/7265* (2013.01); *B32B 2307/73* (2013.01); *B32B 2307/732* (2013.01); *B32B 2313/04* (2013.01); *B32B 2375/00* (2013.01); *B32B 2437/00* (2013.01); *B32B 2457/00* (2013.01)

(58) Field of Classification Search
    CPC .............. B32B 37/12; B32B 2250/02; B32B 2262/0292; B32B 2305/026; B32B 2305/18; B32B 2307/724; B32B 2307/7265; B32B 2307/73; B32B 2307/732; B32B 2313/04; B32B 2375/00; B32B 2437/00; B32B 2457/00; C23C 14/165; C23C 14/30; C23C 14/34; C23C 16/0209; C23C 16/0281; C23C 16/26; C23C 16/56

See application file for complete search history.

(56) References Cited

U.S. PATENT DOCUMENTS

| 2014/0151288 | A1* | 6/2014 | Miller .................... B32B 5/024 |
| | | | 210/500.39 |
| 2015/0273401 | A1 | 10/2015 | Miller et al. |
| 2018/0187331 | A1* | 7/2018 | List, III ................. C23C 16/26 |
| 2018/0346338 | A1 | 12/2018 | Cho et al. |

FOREIGN PATENT DOCUMENTS

| CN | 104261403 A | 1/2015 | |
| CN | 109554329 A | 3/2019 | |
| EP | 2511002 A1 | 10/2012 | |
| EP | 3254750 A1 * | 12/2017 | .......... A41D 31/102 |
| KR | 1020120081935 A | 7/2012 | |
| KR | 101325575 B1 | 11/2013 | |
| TW | 201439359 A | 10/2014 | |
| WO | 2014084860 A1 | 6/2014 | |
| WO | 2015167145 A1 | 11/2015 | |
| WO | 2017212039 A1 | 12/2017 | |

OTHER PUBLICATIONS

Karamat, S. H. U. M. A. I. L. A., et al. "Suitable alkaline for graphene peeling grown on metallic catalysts using chemical vapor deposition." Applied Surface Science 368 (2016): 157-164.*
Choi, Kyoungjun, et al. "Multifunctional wafer-scale graphene membranes for fast ultrafiltration and high permeation gas separation." Science Advances 4.11 (2018): eaau0476.*
Choi, Jae-Kyung, et al. "Growth of wrinkle-free graphene on texture-controlled platinum films and thermal-assisted transfer of large-scale patterned graphene." ACS nano 9.1 (2015): 679-686.*
Zou, Zhiyu, et al. "Uniform single-layer graphene growth on recyclable tungsten foils." Nano Research 8 (2015): 592-599.*
Al-Hilfi, Chemical Vapour Deposition of Graphene on Copper-Nickel Alloy, 2018, https://www.research.manchester.ac.uk/portal/files/86865930/FULL_TEXT.pdf.
Dong, Yibo, et al., "The Growth of Graphene on Ni—Cu AlloyThin Films at a Low Temperature and Its Carbon Diffusion Mechanism", Nanomaterials, 2019, p. 1633, vol. 9, No. 11.
Losurdo, Maria, et al., "Graphene CVD growth on copper and nickel: role of hydrogen in kinetics and structure", Phys. Chem, Chem, Phys., 2011, pp. 20836-20843, vol. 13.

* cited by examiner

FIG. 3a
FIG. 3b
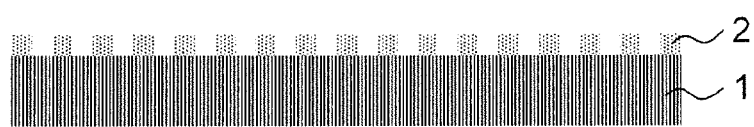
FIG. 3c
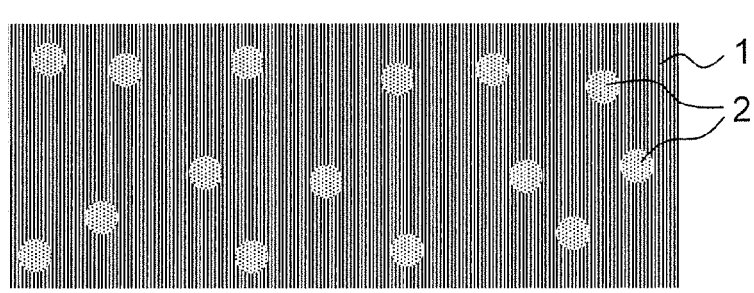
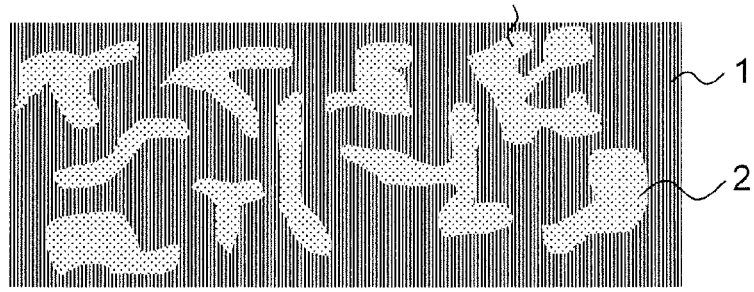
FIG. 4
FIG. 5a
FIG. 5b
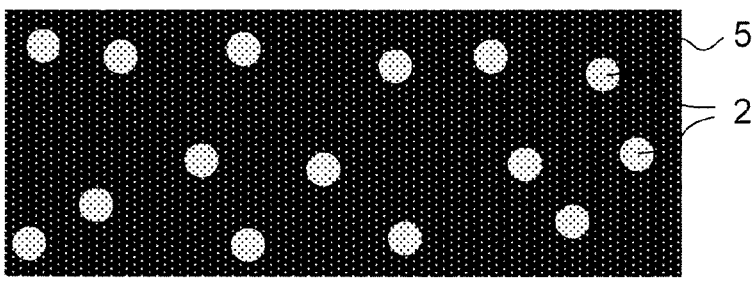
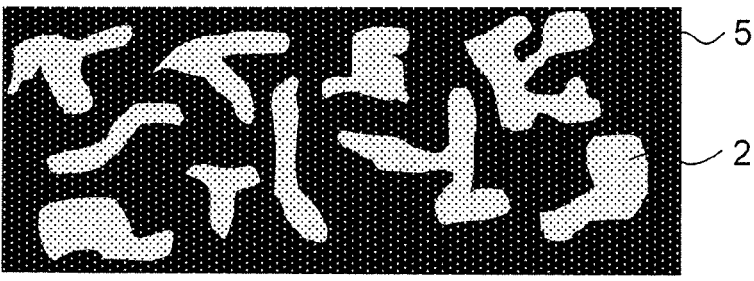
FIG. 6

200 nm 200 nm

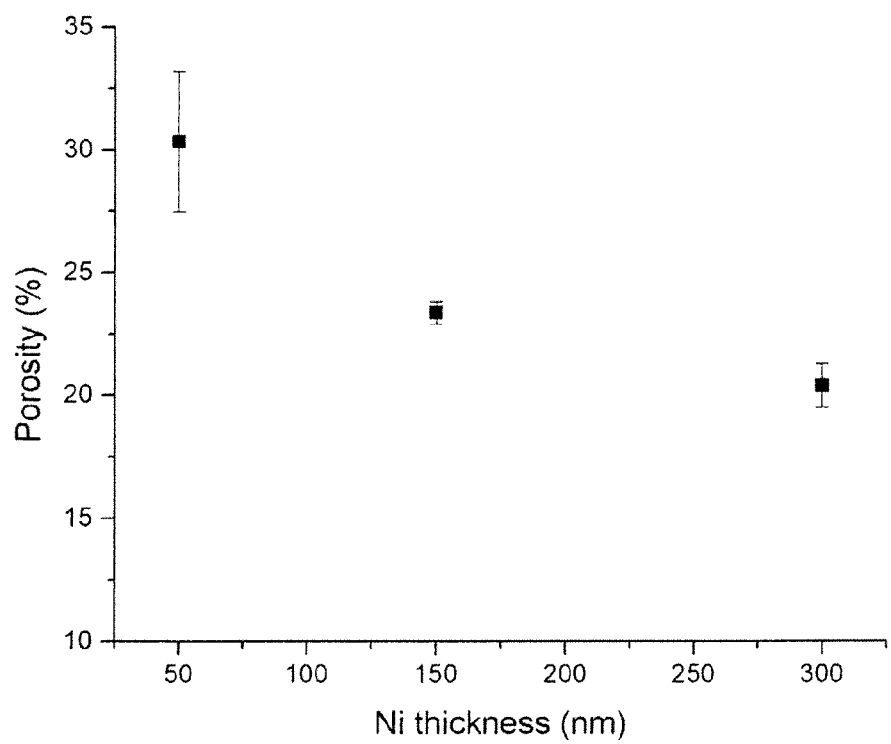
FIG. 14
FIG. 15a
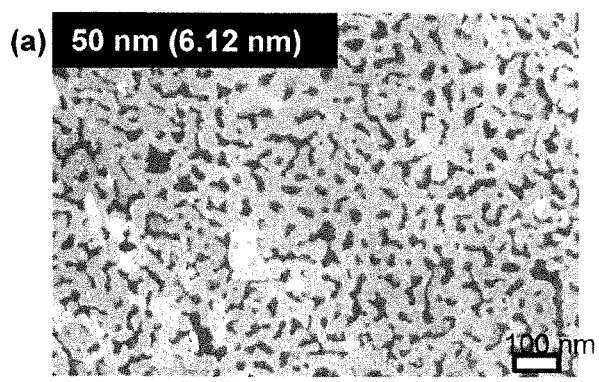
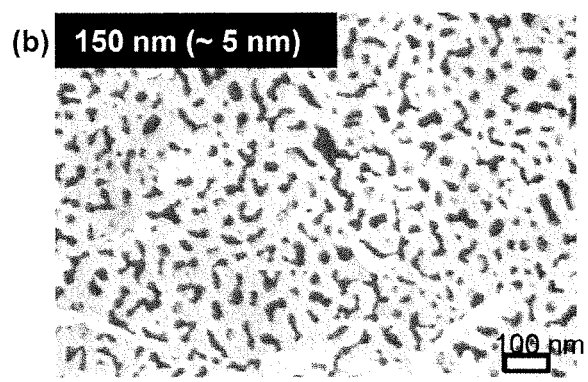
FIG. 15b
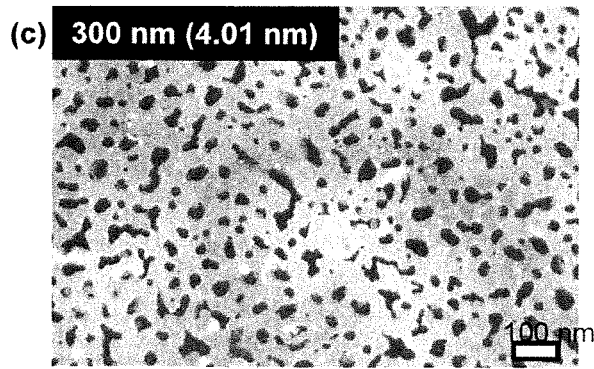
FIG. 15c

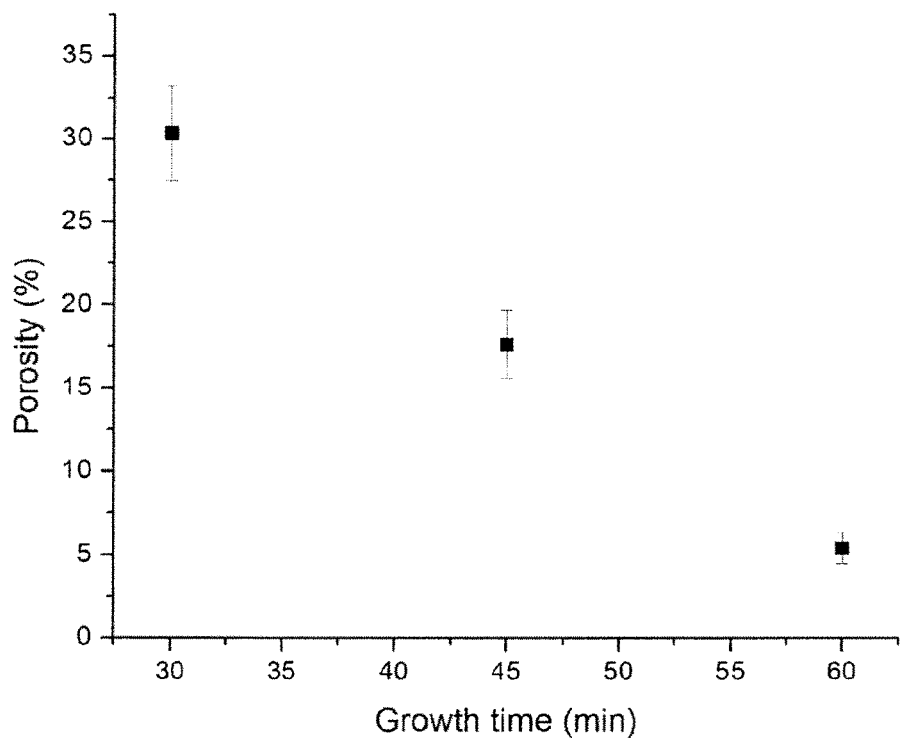
FIG. 17a  FIG. 16
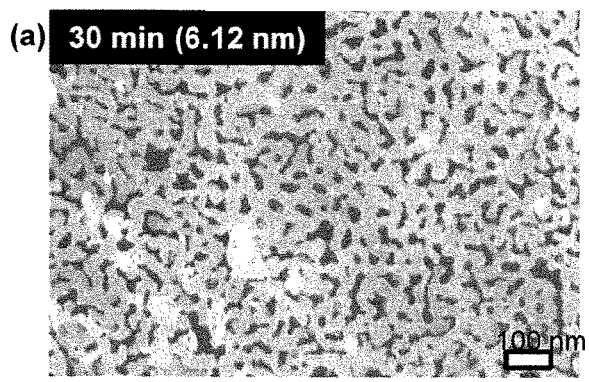
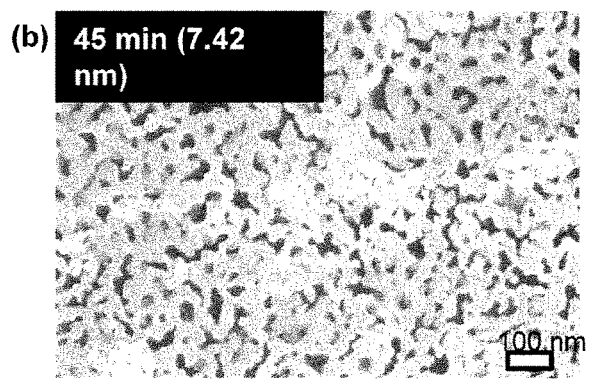
FIG. 17b
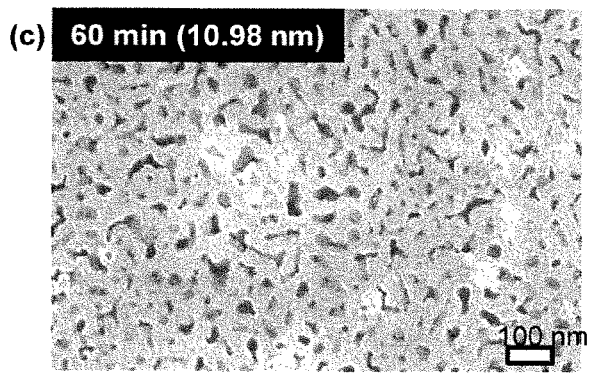
FIG. 17c

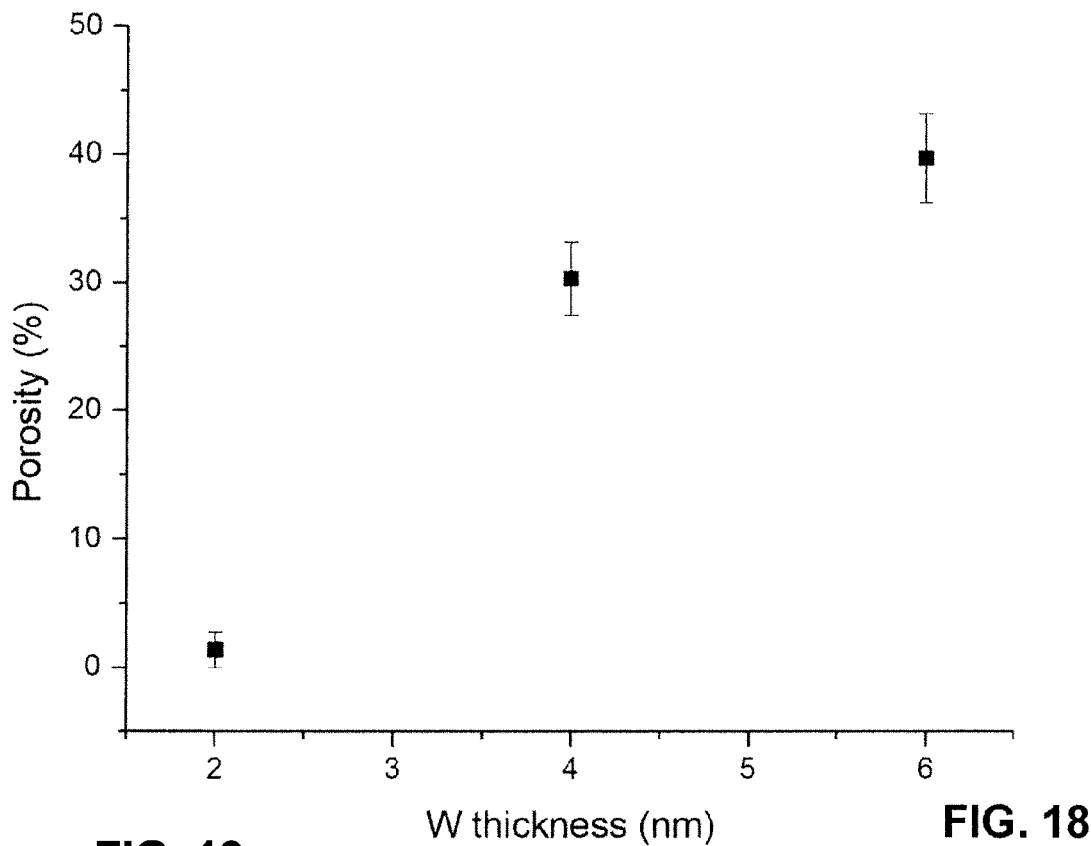
FIG. 18
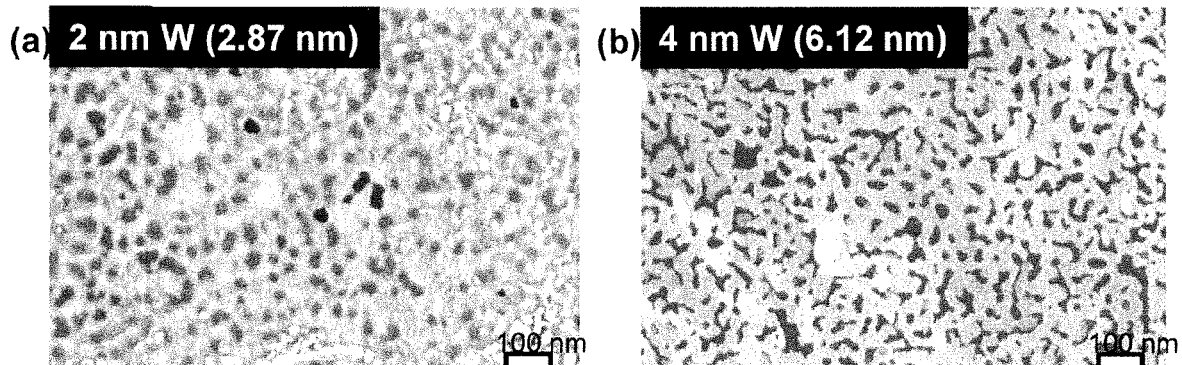
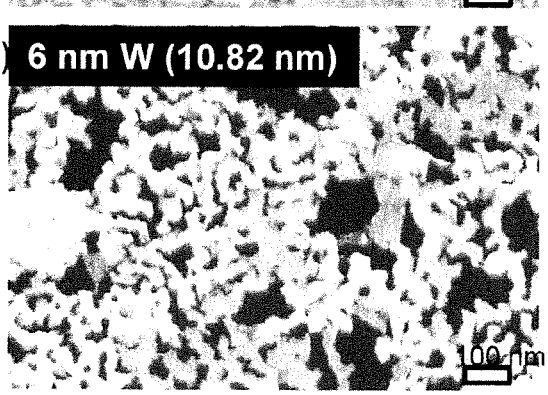
FIG. 19a
FIG. 19b
FIG. 19c

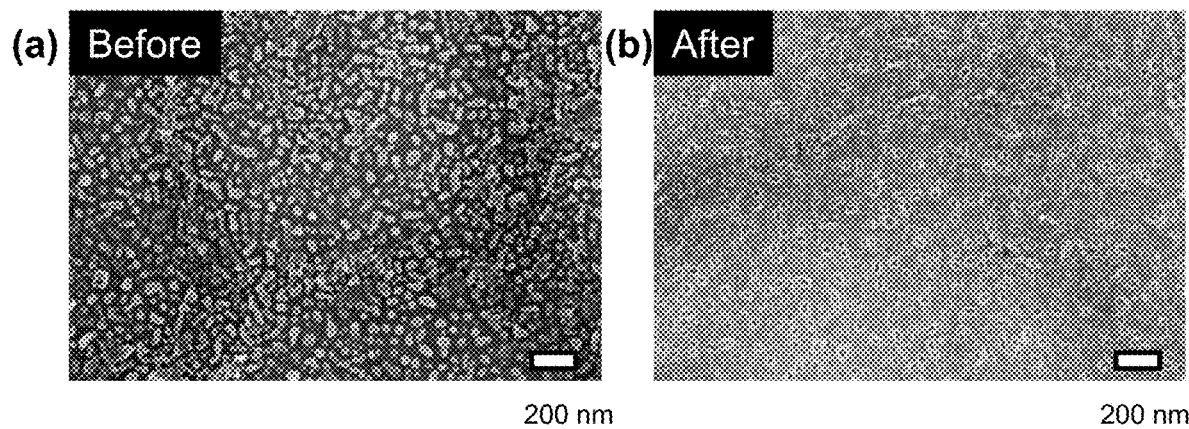
FIG. 20a  FIG. 20b
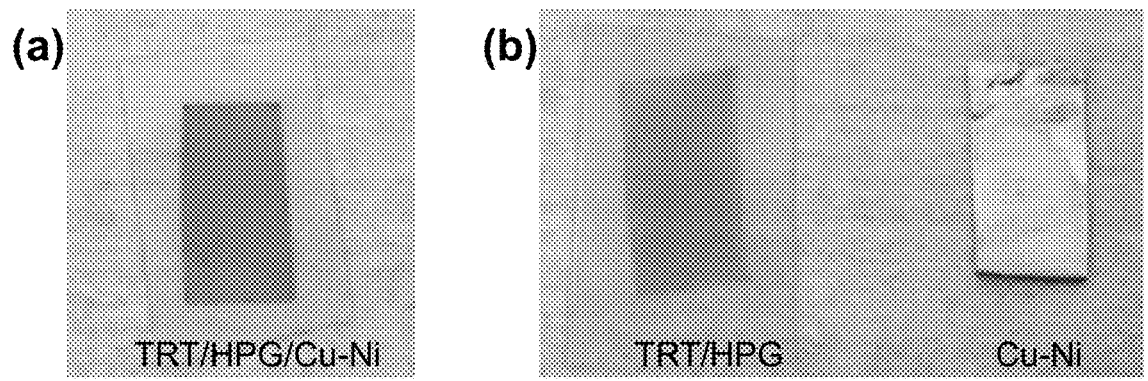
FIG. 21a  FIG. 21b
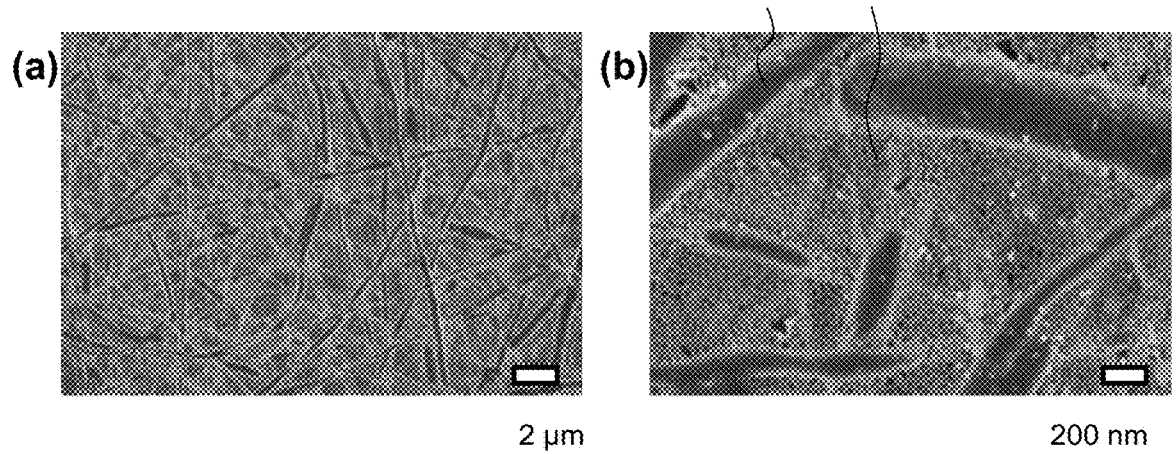
FIG. 22a  FIG. 22b

FIG. 23a
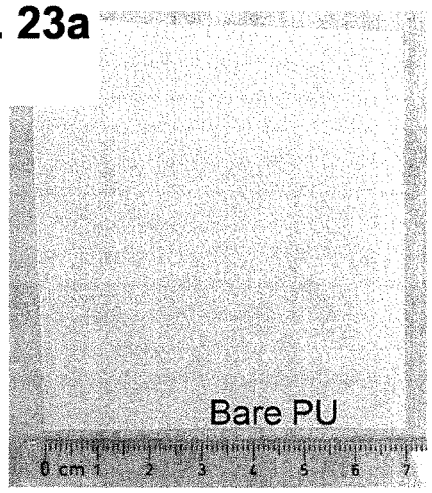
FIG. 23b
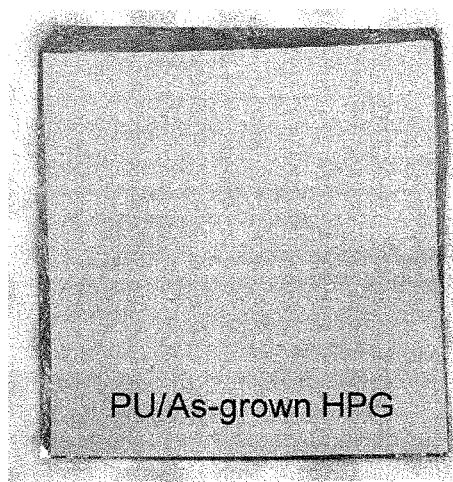
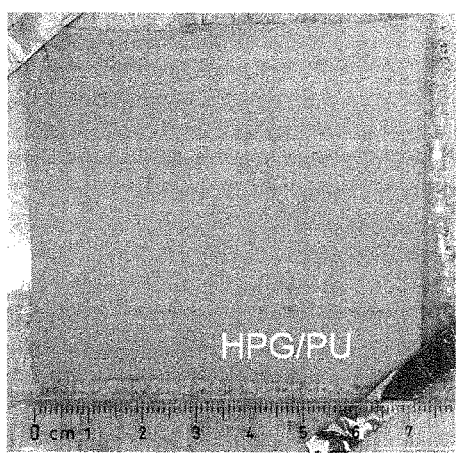
FIG. 23c
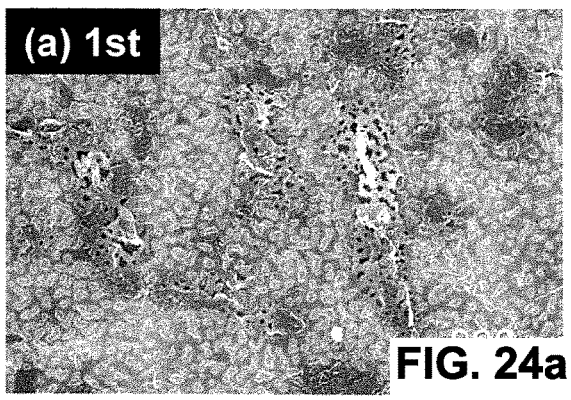
FIG. 24a
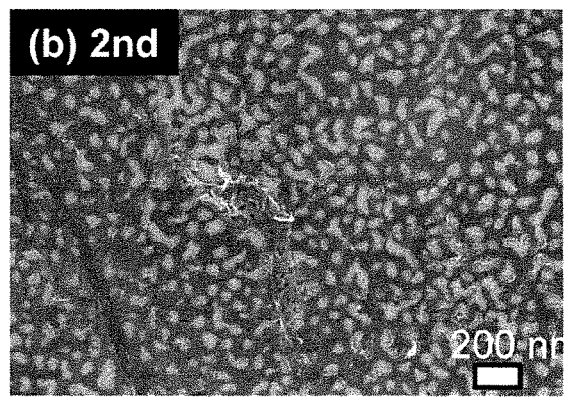
FIG. 24b
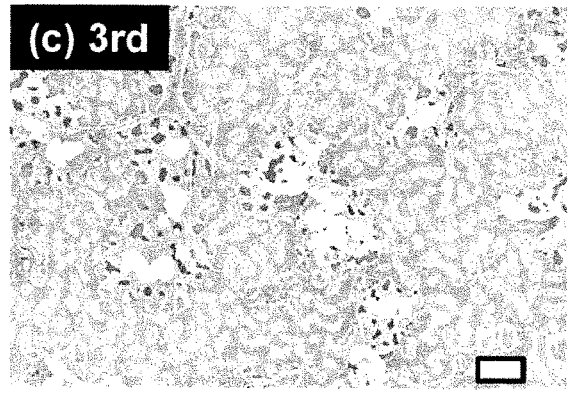
FIG. 24c

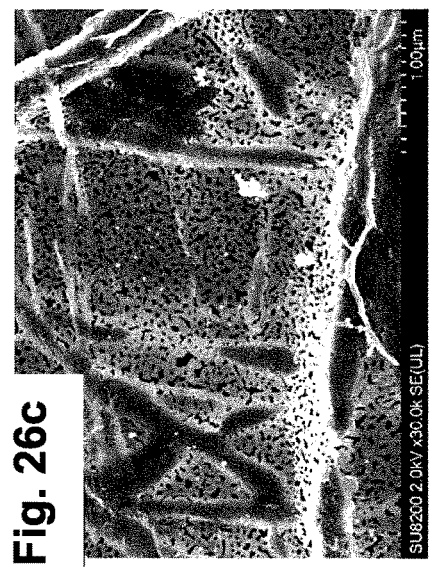
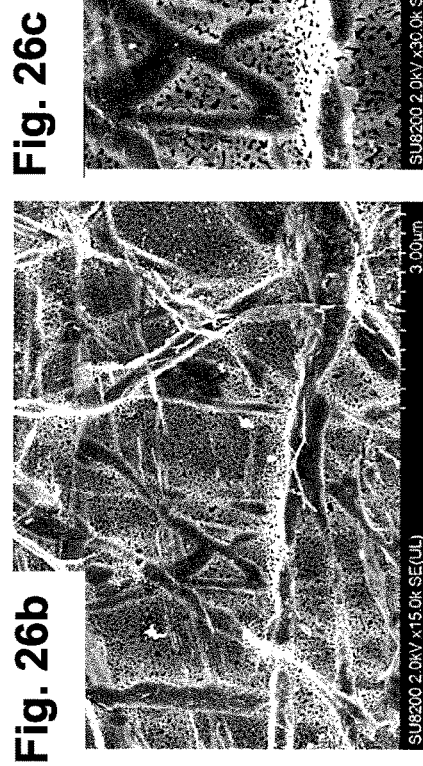
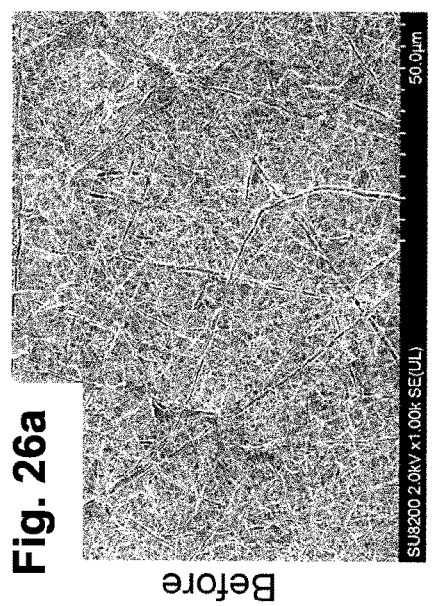

METHOD FOR MAKING POROUS GRAPHENE MEMBRANES AND MEMBRANES PRODUCED USING THE METHOD

CROSS-REFERENCE TO RELATED APPLICATIONS

This application is the United States national phase of International Application No. PCT/EP2020/084050 filed Dec. 1, 2020, and claims priority to European Patent Application No. 19218038.8 filed Dec. 19, 2019, the disclosures of which are hereby incorporated by reference in their entirety.

BACKGROUND OF THE INVENTION

Field of the Invention

The present invention relates to a method for producing porous ('holey') graphene membranes that are waterproof yet highly breathable due to enhanced vapor transmission through the pores perforated within graphene layers. Furthermore, it relates to graphene membranes made using the method and uses of such membranes, as well as to catalytic substrates and uses thereof for making such membranes.

Description of Related Art

Waterproof membranes used in outdoor apparel are effective against high liquid static pressures (rain penetration resistance). However, in general they suffer from low vapor permeability to allow sufficient moisture vapor transport, breathability of the garments and user comfort.

Highly breathable membranes are also relevant to various technical textile applications including military uniforms for chemical protection, emergency responder uniforms, protective gloves and outdoor electronic circuit protective packaging. Membranes offering high efflux rates and/or selectivity also have a wide range of potential applications in separations and energy applications.

They would also spark on many other potential areas of applications, unseen for the present absence of highly breathable membranes.

While GoreTex® is dominant in the waterproof membrane market, there are numerous alternative membrane providers manufacturing membranes from various polymers besides PTFE such as polyamide and polyurethanes. In each case, the membranes consist of a polymer film with small pores to enable passage of water vapor. The thickness of conventional membranes and limitations on pore area density limits the magnitude of vapor transport.

One proposed replacement material for applications where high vapor transmission and water sealing properties are required is porous graphene. Graphene, a two-dimensional, single-layer sheet of $sp^2$ hybridized carbon atoms, has attracted world-wide attention and research interest, owing to its exceptional physical properties, including high electronic conductivity, thermal stability, and mechanical strength. The use of porous graphene membranes in fabric laminate structures has been proposed in the following documents:

WO-A-2014084860 generally describes the fixation of a porous graphene layer onto a fibrous substrate backing. It describes the laminate assembly together with methods for constructing and assembling the laminate. It does not describe a method used to form the porous graphene layer.

US-A-2015273401 expands on the method described in WO-A-2014084860 with an assembly of a porous graphene membrane on a fabric substrate together with inclusion of selective membrane layers on the side of the graphene layer. The making of porous graphene membrane material is sketched to involve the growing of a contiguous monolayer and perforating the layer and a subsequent step.

Aspects relevant to the present invention in relation with porous graphene and its various production methods can be summarized as follows as categories and sub-categories.

Category 1: Post-Synthesis Formation of Porous Graphene—Serial Processes

Post-synthesis formation involves perforating holes in a contiguous graphene layer, which is synthesized in a prior step. Serial processes involve hole-by-hole fabrication of the porous graphene layer. This is a slow process, which offers minimal utility for scale-up production of porous membranes.

Category 1.1: Nitrogen Assisted E-Beam Perforation

Scanning electron microscope (SEM) imaging in presence of nitrogen gas can be used to induce a localized reactive ion etching process by ionizing the nitrogen molecules with the focused electron beam of the SEM. With this approach, pores down to 10 nm can be etched into multilayer graphene (less than 10 layers). However, nitrogen ion diffusion out of the region of electron beam focus causes pores to etch outside of the region of interest questioning this approach to yield dense arrays of small pores. Additionally, use of the SEM makes it a serial pore milling process, which is difficult to scale up.

Category 1.2: FIB & Unfocused E-Beam Patterning

In this two-step process, first 3 keV, $Ar^+$ focused ion-beam (FIB) is used to create one- and two-atomic defects into a graphene monolayer which needs to be cooled to 148K to obtain the desired defect sizes. Next, an unfocused electron beam with 80 keV is used to grow the defects from the pore fringe, while leaving the non-defected graphene parts unaffected enabling down to 0.6 nm diameter pore creation.

Alternatively, focused ion beams using either $Ga^+$ or $He^+$ ions can be used to create pores from 1000 nm to sub-10 nm in size. The process enables control over the pore size, pore density, and pore arrangement, however due to the serial nature of the milling, scale-up remains difficult. Also, milling of sub-5 nm pores is challenging.

WO-A-2015167145 discloses a graphene membrane and a method for manufacturing the same. The graphene membrane includes a graphene layer having a porous pattern including a plurality of pores having a size of 5 to 100 nm and a supporter configured to support the graphene layer and including a plurality of pores having a greater size than the intended pores of the graphene layer. The proposed method involves the formation of block copolymer domains on the graphene surface to form a mask template. Subsequent exposure to ion beam irradiation is used to etch pores into the graphene layer.

Category 1.3: TEM Based Methods

In order to measure the translocation of DNA through graphene nanopores, free-standing graphene can be perforated by a 300 kV acceleration voltage electron beam in a transmission electron microscope (TEM). Mono- and multilayer graphene can be patterned with pores ranging from 2 nm-40 nm. No amorphization is observed in the vicinity around the pore, indicating that the local crystallinity is preserved. This method is however not parallel and takes quite some time.

Category 2: Post-Synthesis Formation of Porous Graphene—Parallel Processes

Post-synthesis formation involves perforating holes in a contiguous graphene layer, which is synthesized in a prior step. Parallel processing involves perforating the graphene layer in multiple locations at the same time.

Category 2.1: Ultraviolet-Induced Oxidative Etching

UV-etches are performed to create sub-nm defects into graphene, which grow upon prolonged exposure. Repeating 15 etches with 1 min exposure to a bilayer graphene membrane e.g. yield pores that show size selective sieving of $SF_6$, which has a kinetic diameter of 4.9 Å.

Category 2.2: Ion Bombardment & Oxidative Etching $Ga^+$ ions with 8 keV can be accelerated at the graphene surface with 52° angle of incidence creating defects into the graphene lattice. Subsequently, the graphene defects can be etched using acidic potassium permanganate to etch unsaturated carbon bonds and thus enlarge the pore until a stabilization at 0.4 nm pore diameter after 60 min etch time occurs, which is thought to originate from formation of functional groups inhibiting a further growth reaction.

Category 2.3: Oxygen Plasma

Sub-nm pores can be created by exposing suspended monolayer graphene to 1-6 s of oxygen plasma etch (20 W), where the etch time determines the pore size and density. Pore sizes of 0.5-1 nm at a pore density of 1 pore/100 $nm^2$ can be achieved with 1.5 s exposure to the plasma.

Category 2.4: Strain-Assisted Pt Nanoparticle Perforation

Self-assembly of block copolymer (BCP) micelles containing Pt precursor leads to distributed Pt nanoparticles across a substrate onto which a previously prepared graphene monolayer can be transferred such that perforation is obtained after annealing at 400° C. Catalytic perforation of graphene is facilitated due to localized strain at the Pt nanoparticles. The pore size and density can be controlled with the micelle composition leading down to 17 nm pores at 12.8% porosity. Large-scale perforation in theory should be possible, however obtaining a uniform dispersion of Pt precursors is challenging and the largest areas shown are ca. 41 $\mu m^2$.

Category 2.5: Perforation Using Catalytic Oxidation in Contact with Metal Particles KR-A-20120081935 and KR-A-101325575 propose to apply a thin metal film layer (Au or Ag) deposited onto surface of an existing graphene layer followed by an annealing step to form metal particle domains on the graphene surface. Further thermal steps lead to formation of pores at the contact to the metal domains via a catalytic oxidation.

Category 2.6: Using Anodic Alumina as Template

Graphene on a substrate can be patterned using an anodic alumina membrane. The anodic alumina is placed with the small pore side facing the existing contiguous graphene substrate and a plasma exposure removes the graphene if not protected by the alumina. The resulting pore size is 40 nm-60 nm.

Category 3: Formation of Porous Graphene Membranes from Graphene Platelets

Porous membranes of graphitic layers may alternatively be formed through the assembly of films composed of graphene (or graphene oxide) platelets. The platelets in principle form a laminar structure with pores forming between the platelet boundaries. The graphene platelet approach tends to form relatively thick layers that do not fully exploit the inherent two-dimensional planar (low thickness) geometry of graphene.

Category 3.1: Pore Template During Film Formation

CN-A-104261403 describes a preparation method for graphene film with a three-dimensional porous structure. Polystyrene domains are used as a sacrificial template for pore formation within a film layer formed from graphene oxide platelets as starting material.

Category 4: Direct Synthesis of Porous Graphene Membranes

Direct synthesis of porous graphene membranes involves the simultaneous formation of graphene layer(s) that directly form porous features in the graphene layer. Direct synthesis methods avoid the need for post-synthesis processing to achieve the porous structure.

Category 4.1: Pores Due to Grain Boundary Defects

EP-A-2511002 proposes the growth of a graphene layer on an untreated copper substrate. The monolayer is subsequently solution coated with PMMA and then immersed in an etchant to remove the copper. The PMMA-layer carrying the graphene layer was attached to a PTMSP film and the PMMA layer removed using a solvent. In the resultant graphene layer a plurality of grains of graphene is present with pores as defects between the graphene grains. The patent describes the membrane properties for separation of various substances from liquids and gases.

Category 4.2: Template Patterning of Carbon Source Followed by Graphene Layer Formation CN-A-103241728 provides a method for preparing a graphene nanopore array, which comprises the following steps: 1) coating a carbon source solution on the surface of a porous anodic alumina (PAA) template; 2) pressing the PAA template with the carbon source coated on the surface of a metal base, peeling the PAA template, and ensuring that the carbon source is preserved on the surface of the metal base and the carbon source preserves a pattern which is consistent with that on the surface of the PAA template; and 3) performing annealing treatment on the obtained metal base in the presence of a mixed gas flow of hydrogen gas and argon gas, thus converting the carbon source into the graphene nanopore array. The nanopore array obtained by the invention is an interconnected nanopore array structure rather than a single nanopore or several nanopores; and the pore size of the nanopores can be regulated through the template effect of the PAA itself, and can be further regulated through growing and etching in the later stage.

TW-A-201439359 describes a method for forming a large-area graphene layer on a porous substrate by a chemical vapor deposition process. In a first step, carbon material is deposited onto a porous template using CVD. In a second step, the carbon material undergoes annealing and catalytic graphitization to convert the carbon to a graphene layer. In a third step, liquid exfoliation is used to reduce the number of graphene layers on the substrate.

Category 4.3: Direct Growth of Porous Graphene Using Porous Templates and Patterns CN-A-102583337 describes a preparation method for graphene material with porous structure. Porous magnesium oxide/silicon composite material is used as a template substrate. Chemical Vapor Deposition (CVD) is used to grow graphene directly on the porous template. The graphene layer retains the porous structure of the template substrate. The porous graphene layer is recovered by destructive etching of the magnesium oxide/silicon composite substrate.

US-A-2012241069 discloses how a graphene pattern is fabricated by forming a pattern of passivation material on a growth substrate. The pattern of passivation material defines an inverse pattern of exposed surface on the growth substrate. A carbon-containing gas is supplied to the inverse pattern of the exposed surface of the growth substrate, and patterned graphene is formed from the carbon. The passivation material does not facilitate graphene growth, while the inverse pattern of exposed surface of the growth substrate facilitates graphene growth.

US-A-2013160701 proposes methods for growing microstructured and nanostructured graphene by growing the microstructured and nanostructured graphene from the bottom-up directly in the desired pattern. The graphene structures can be grown via chemical vapor deposition (CVD) on substrates that are partially covered by a patterned graphene growth barrier which guides the growth of the graphene.

WO2017212039 proposes a method for making a porous graphene layer of a thickness of less than 100 nm with pores having an average size in the range of 5-900 nm, comprising the following steps: providing a catalytically active copper substrate catalyzing graphene formation under chemical vapor deposition conditions, said catalytically active substrate in or on its surface being provided with a plurality of catalytically inactive domains having a size essentially corresponding to the size of the pores in the resultant porous graphene layer; chemical vapor deposition using a carbon source in the gas phase and formation of the porous graphene layer on the surface of the catalytically active substrate, the pores in the graphene layer in situ being formed due to the presence of the catalytically inactive domains.

In the field of graphene CVD growth Dong et al (The Growth of Graphene on Ni—Cu Alloy Thin Films at a Low Temperature and Its Carbon Diffusion Mechanism, Nanomaterials (Basel). 2019 November; 9(11): 1633) found that carbon solid solubility in metals is an important factor affecting uniform graphene growth by chemical vapor deposition (CVD) at high temperatures. At low temperatures, however, it was found that the carbon diffusion rate (CDR) on the metal catalyst surface has a greater impact on the number and uniformity of graphene layers compared with that of the carbon solid solubility. The CDR decreases rapidly with decreasing temperatures, resulting in inhomogeneous and multilayer graphene. In the work, a Ni—Cu alloy sacrificial layer was used as the catalyst based on the following properties. Cu was selected to increase the CDR, while Ni was used to provide high catalytic activity. By plasma-enhanced CVD, graphene was grown on the surface of Ni—Cu alloy under low pressure using methane as the carbon source. The optimal composition of the Ni—Cu alloy, 1:2, i.e. a Ni proportion of 33%, was selected through experiments. In addition, the plasma power was optimized to improve the graphene quality. On the basis of the parameter optimization, together with our previously-reported, in-situ, sacrificial metal-layer etching technique, relatively homogeneous wafer-size patterned graphene was obtained directly on a 2-inch SiO2/Si substrate at a low temperature (~600° C.).

Losurdo et al (GrapheneCVD growth on copper and nickel: role of hydrogen in kinetics and structure, Phys. Chem. Chem. Phys., 2011, 13, 20836-20843) report, that understanding the chemical vapor deposition (CVD) kinetics of graphene growth is important for advancing graphene processing and achieving better control of graphene thickness and properties. In the perspective of improving large area graphene quality, they have investigated in real-time the CVD kinetics using CH4-H2 precursors on both polycrystalline copper and nickel only substrates. They highlighted the role of hydrogen in differentiating the growth kinetics and thickness of graphene on copper and nickel. Specifically, the growth kinetics and mechanism is framed in the competitive dissociative chemisorption of H2 and dehydrogenating chemisorption of CH4, and in the competition of the in-diffusion of carbon and hydrogen, being hydrogen in-diffusion faster in copper than nickel, while carbon diffusion is faster in nickel than copper. It is shown that hydrogen acts as an inhibitor for the CH4 dehydrogenation on copper, contributing to suppress deposition onto the copper substrate, and degrades quality of graphene. Additionally, the evidence of the role of hydrogen in forming C—H out of plane defects in CVD graphene on Cu is also provided. Conversely, resurfacing recombination of hydrogen aids CH4 decomposition in the case of Ni. Understanding better and providing other elements to the kinetics of graphene growth is helpful to define the optimal CH4/H2 ratio, which ultimately can contribute to improve graphene layer thickness uniformity even on polycrystalline substrates.

Samir Al-Hilfi (Chemical vapour deposition of graphene on Cu—Ni alloy, Thesis, The University of Manchester, 2018) has explored the impact of C solubility in the catalytic substrates, on the CVD growth of graphene. Cu—Ni alloys show complete solid solubility across their composition range and can be used to explore the influence of C solubility on graphene growth. Graphene is grown on Cu—Ni alloys of composition Cu, Cu70—Ni30, Cu55—Ni45, Cu33—Ni67 and Ni in a hot-wall CVD reactor. So, in all cases either the substrate was Ni free or contained at least 30% Ni. Firstly, the growth was achieved on pure metals (Cu and Ni) using CH4 as a C source and the produced film was characterised by Raman spectroscopy and scanning electron microscopy (SEM). The C profile within the substrate bulk was measured by glow discharge optical emission stereoscopy (GDOES). The latter showed the difference in bulk C content between Cu and Ni, which reflects the influence on the graphitic film on the surface. The CVD growth of graphene on Cu—Ni alloy showed a transition from bilayer graphene (BLG) to few layer graphene (FLG) surface coverage when the Ni content increased, which is accompanied by an increase in the diffusion of C in the bulk and incubation time. The cooling rate showed a significant effect on the graphene surface coverage; however, the influence varied with Ni content. The fluid flow simulation indicated that the gas velocity beneath the substrate is very low which results in a lower mass transfer to the bottom substrate surface. Gas-phase kinetics simulation reveals the impact of gas residence time on the concentration of active species; moreover, the concentration increases down the stream of the flowing gas. Finally, the surface reactions of the CH4/H2 mixture model showed a good agreement with the experimental observations under low growth pressure; however, it failed at high growth pressure.

In summary, the existing technology for the waterproof breathable membranes can be improved and there exists room for improvement and needs for breakthrough technology to gain vapor breathability (rapid gas phase transport) while maintaining the liquid barrier properties, for the sake of customer comfort and protection of materials beneath the garment or packaging. Porous graphene membranes have been proposed for such applications, and also have been analyzed and compared with conventional breathable membranes and have been shown to exhibit better breathability, but the existing processes for making suitable porous graphene membranes are not always sufficiently suitable for upscaling and industrial processes.

SUMMARY OF THE INVENTION

It is an object of the present invention to provide a new method for the making of highly porous graphene layers and multilayer structures containing such porous graphene layers for the above-mentioned uses as membranes. Furthermore, it is an object to provide the corresponding tools for the making process, in particular catalytic substrates et cetera. Also it is an object of the present invention to propose the correspondingly obtained porous graphene layers, as well as multilayer structures including such porous graphene layers.

The newly proposed method for making graphene layers is in particular characterised by being a simple reliable process allowing for reusing the catalytic substrate and allowing a simple synthesis process of the graphene layer as such but also of the subsequent transfer into a multilayer structure. The resulting graphene layers are in particular characterised by a high porosity in combination with (mechanically robust) high thickness, and/or mechanical rigidity, alone or in combination with specific woven or nonwoven fabrics, such as polyurethane nonwoven fabrics.

The proposed method includes the following elements: 1. The preparation of a specific copper/nickel alloy catalytic substrate; 2. The preparation of a topology of catalytically inactive material on top of such a catalytic substrate in the form of catalytically inactive nanostructures; 3. The synthesis of a porous graphene layer on a copper/nickel alloy catalytic substrate with such a topology of catalytically inactive nano material; 4. Delamination separation of the porous graphene layer from the catalytic substrate, preferably by electrochemical separation methods; 5. Mechanical delamination of the porous graphene layer from the catalytic substrate; 6. Applying such a porous graphene layer on the nonwoven or porous fabric.

These individual steps can be carried out as follows:
1. Preparation of Cu—Ni Alloy:

Cu catalyst e.g. as purchased from Alfa Aesar (Copper foil, 0.025 mm, 99.8%, Product No. 49686) is provided; a Ni film with a varied thickness from 10 nm to 2.2 µm or 50 to 300 nm is deposited on as-received commercial Cu catalyst by E-beam evaporator or sputtering in vacuum (e.g. FHR, Pentaco 100, Ni purity 99.95% 3×10–3 mbar); pressure of the sputtering is about 0.006 mbar with 200 sccm of Ar; the resulting film of Ni is deposited from 10 nm to 2.2 µm or 50 to 300 nm with DC plasma whose power is 0.25 kW; a bi-layered structure of Ni/Cu catalyst is annealed at e.g. 1000° C. for e.g. 1 hour to convert to a binary metal alloy (Cu—Ni alloy) under low pressure (e.g. 200 mTorr) with e.g. 50 sccm of $H_2$ in a chemical vapor deposition (CVD) system (e.g. Graphene Square. Inc, TCVD-RF100CA).

The concentration of Ni is more than 0.04% to 10% or preferably in the range of more than 0.04 to 2% by weight, or also in the range of 0.1-10% preferably in the range of 0.2-8% or 0.3-5%, typically in the range of 0.4-3%. Particularly preferably, the catalytically active substrate has a nickel content in the range of 0.06-1% by weight or 0.08-0.8% by weight complemented to 100% by weight by the copper content. The balance is Cu (for the broadest range it is thus 99.96-90%, for a typical range it is 99.94 less than 99% or 99.6-97%, the balance does not include very minor impurities which can be present in the starting Cu foil or in the starting Ni, and which in the final substrate make up less than 0.05% or less than 0.02% by weight in total). The range of Ni content depends on the initial Ni thickness. The typical working content of Ni is preferably in the range of 0.5-2%.
2. Conversion of W Thin Film into W Nanostructures:

A thin film of W (thickness 1-10 nm) is deposited on the Cu—Ni alloy according to the preceding paragraph by sputtering or E-beam evaporator in vacuum (e.g. FHR, Pentaco 100, W purity 99.95%) with e.g. E-beam evaporator or sputtering in vacuum (e.g. $3 \times 10^{-3}$ mbar); the pressure of the sputtering is e.g. 0.002 mbar with e.g. 100 sccm of Ar; the thin film of W is deposited from 1 to 10 nm with e.g. 0.25 kW of DC plasma; a W/Cu—Ni alloy is mounted in the center of a 4-inch quartz tube chamber positioned in the furnace of the CVD system (e.g. Graphene Square. Inc, TCVD-RF100CA); the chamber is evacuated to reach a pressure of e.g. 45 mTorr and then purged with inert gas, e.g. $N_2$ (e.g. 100 sccm) for e.g. 5 min normally at room temperature; after purging, the chamber is put under vacuum (e.g. 45 mTorr) again and then the pressure is increased e.g. with a gas mixture of Ar and $H_2$ (800 sccm and 40 sccm, respectively); to convert the W thin film into W nanostructures (NSs). The NSs are based variously on symmetric W nanoparticles and asymmetric W nanowalls with various degrees of interparticle agglomeration. The W/Cu—Ni alloy is carefully annealed at elevated temperature (e.g. 750-950° C. or 800-900° C.) for an extended period of time, e.g. 1 hour including ramping with the continuous supply of e.g. 800 sccm of Ar and 40 sccm of $H_2$ under 4 Torr.
3. Synthesis of Highly Porous Graphene Once W nanostructures appear in the process according to the preceding paragraph, a hydrocarbon source for example 40 sccm of methane is introduced in the chamber with e.g. 300 sccm of Ar and 40 sccm of $H_2$ under 4 Torr in the low-pressure CVD system; depending on the desired level of porosity or thickness, a growth duration is carefully controlled from e.g. 5 to 120 min; afterwards, the furnace is programmed to cool to room temperature under flow of Ar and $H_2$. Under these conditions, a total CVD time of 120 minutes leads to a graphene layer thickness of approximately 10 nm. CVD time of 5 minutes leads to a graphene layer thickness of approximately below 1 nm, but this may also depend on further parameters.
4. Electrochemical Delamination of Highly Porous Graphene Via Electrochemistry:

After the growth of highly porous graphene, pre-leaching process for as-grown highly porous graphene in e.g. 0.1 M NaOH is conducted for e.g. 10-60 min at normally mild temperature (40-60° C.). The sample material can subsequently be rinsed with DI-water and dried prior to the next step; Poly(methyl methacrylate) (PMMA) or another material, such as a polymeric porous membrane for example polyurethane (PU; e.g. Finetex ENE) as a supporting material is assembled onto the sample as a support layer. A range of concentrations of 0.5-1.5 M NaOH proves to be suitable, lower concentrations lead to unacceptably long pre-leaching times, using higher concentrations the copper/nickel substrate will be degraded.

PMMA: PMMA (950k, AR-P 672.03) can be used; spin-coated with e.g. 4000 rpm for 40 sec.; the PMMA/highly porous graphene can be baked at 110° C. for 1 min.

Isopropyl alcohol can be applied on stacked PU/as-grown highly porous graphene on Cu—Ni alloy to achieve close interfacial attachment while drying. A melt adhesion step under controlled may also be used.

The sample and Pt electrode are connected to a respective anode and cathode of power supply (e.g. GW Instek, GPR-3060D) for example in aqueous NaOH solution (1 M).

The highly porous graphene with the supporting material can then be delaminated from the designed catalyst via $H_2$ bubbles electrochemically generated between an interface of the highly porous graphene and a surface of the catalyst by applying a voltage (3-10 V).
Recycling of the Catalytic Substrate:

After the process of electrochemical delamination, the Cu—Ni alloy can be re-used to grow highly porous graphene, repeatably.

5. Mechanical Delamination of Highly Porous Graphene

As-grown highly porous graphene on Cu—Ni alloy is immersed in 0.1 M NaOH for 10-60 min or 15-60 min at mild temperature (40-60° C.) to remove/dissolve W NSs and decouple the bonding between highly porous graphene and the surface of Cu—Ni alloy; after the pre-leaching process, the sample can be rinsed by DI-water and dried with $N_2$ gas flow; the sample can be directly attached to for example an adhesive tape for example thermal release tape (e.g. REVALPHA, Nitto Denko) or a water-soluble tape by lamination or pressing tool at room temperature to improve the adhesion; the adhesive tape is mechanically delaminated from the catalyst together with the adhered highly porous graphene.

Recycling of the Catalytic Substrate:

After the process of mechanical delamination, the Cu—Ni alloy can be re-used to grow highly porous graphene, repeatably.

6. Polyurethane Non-Woven Interface:

1. Characteristic filament diameter: 314 nm (standard deviation: 190 nm) (the characteristic filament diameter is defined as a diameter of the individual filament of the non-woven material on average)
2. Characteristic pore width: 1281 nm (standard deviation: 603 nm) (the characteristic pore width is defined as a width of the individual topmost pore in the non-woven material on average). More generally speaking, the present invention according to a first aspect thereof relates to a method for making a porous graphene layer of a thickness of less than 100 nm, in particular with pores having an average characteristic width in the range of 1-1000 nm, preferably in the range of 5-900 nm, comprising the following steps:

providing a catalytically active substrate to catalyse the graphene formation under chemical vapour deposition conditions, said catalytically active substrate on its surface being provided with a plurality of catalytically inactive domains having a nanostructure essentially corresponding to the shape of the pores in the resultant porous graphene layer;

chemical vapour deposition using a carbon source in the gas phase and formation of the porous graphene layer on the surface of the catalytically active substrate, the pores in the porous graphene layer being formed in situ due to the presence of the catalytically inactive domains.

The average characteristic width of the pores is defined and measured as follows:

As the shape of pore becomes elongated and uneven, resulting from the W nanostructures, it is challenging to obtain the pore diameter. The characteristic width was, therefore, chosen and defined as the widest width of pore rather than the diameter of the pore. The characteristic width of the pores was extracted by using image analysis software (ImageJ) on scanning electron microscope (SEM) images. Porous graphene was transferred onto SiNx chip including hole with 4 μm in diameter to make a free-standing section suitable for clear image interpretation. Five representative SEM images of porous graphene were then, taken over 1.14 um² to visualize the clear difference in the contrast between pore and surrounding graphene (e.g., black for pore and grey for graphene). As the characteristic width of pore is few tens of nm, high magnification SEM images were required. Afterward, based on the SEM image, the widest width of each pore opening was measured and the average of the measured widths subsequently calculated.

According to the invention, in particular the catalytically active substrate is a copper-nickel alloy substrate with a copper content in the range of 85-98% by weight or 90-99.9 by weight and a nickel content in the range of 2-15% by weight or in particular more than 0.04-2% by weight, the copper and nickel contents complementing to 100% by weight of the catalytically active substrate. Unexpectedly it was found that using such a catalytically active substrate alloy it is possible to make relatively thick graphene layers having also higher porosity than the previously available porous graphene layers. Without being bound to any theoretical explanation, it appears that this particular alloy allows the provision of particular topologies of catalytically inactive domains on the surface thereof and as a result of this topological structure allows the making of thicker graphene layers with superior gaseous permeation and liquid barrier properties.

According to a first preferred embodiment of the proposed method, the catalytically active substrate has a nickel content in the range of 0.06-1% by weight or 0.08-0.8% by weight.

The catalytically active substrate can for example be prepared by applying, preferably using electrochemical plating, e-beam evaporation, PVD or sputtering, a film of nickel of a thickness in the range of 0.01-2.2 μm, preferably in the range of 25-300 or 20-500 nm, preferably in the range of 50-300 nm on a pure copper foil, preferably having a thickness in the range of 0.01-0.10 mm or 0.02-2 mm, preferably in the range of 0.02-0.04 mm, in particular having a purity of more than 99.5%. Subsequently this structure is subjected to a step of annealing, preferably at a temperature in the range of 800-1200° C., preferably in the range of 900-1100° C., in particular during a time span of 5 minutes-120 minutes, preferably during a time span in the range of 10 min-60 min or 30 minutes-90 minutes.

The porous graphene layer preferably has a thickness in the range of less than 50 nm, preferably in the range of 1-20 nm, in particular in the range of 5-15 nm or 7-12 nm.

For the preferred nickel concentration, the corresponding graphene preferably has an areal porosity (defined as the ratio of total area of pores to total projected area of the layer) of more than 2.5%, preferably of more than 5%, preferably in the range of 10-70%, and at the same time a thickness in the range of more than 1 nm, preferably of more than 2 nm, preferably in the range of 2-15 nm. Further preferably the porous graphene layer has an areal porosity, defined as the areal fraction of pore space in the total graphene layer, in the range of at least 10%, preferably at least 15%, more preferably of at least 20% or at least 25%, or at least 40%.

According to yet another preferred embodiment, the catalytically active substrate is provided on its surface with a plurality of catalytically inactive domains by applying, preferably using sputtering, e-beam evaporation or PVD, an essentially contiguous tungsten layer. Preferably this tungsten layer has a thickness in the range of more than 1 nm, preferably more than 3 nm, more preferably more than 5 nm, or in the range of 1-10 nm, preferably in the range of 5-10 nm. Subsequently this structure is subjected to a step of annealing at a pressure below normal pressure, preferably of less than 100 mTorr or less than 4 Torr, in particular under a reducing atmosphere, preferably in the presence of an inert gas such as argon or nitrogen gas, combined with hydrogen gas, to convert the tungsten film into a plurality of catalytically inactive domains. Typically the annealing takes place at a temperature in the range of 700-1100° C., more preferably in the range of 750-950° C. or 800-900° C., typically during a time span in the range of 10-180 minutes, preferably in the range of 10-60 min or 50-100 minutes.

According to a preferred embodiment the method is adapted such as to obtain catalytically inactive domains having an average characteristic width in the range between 1-1000 nm, preferably in the range of 10-100 nm, more preferably in the range of 10-50 nm, or preferably having an average characteristic width in the range between 5-900 nm, preferably in the range of 10-200 nm, more preferably in the range of 10-100 nm.

According to a second aspect of the present invention, it also and independently of the method relates to catalytically active substrate structures as obtained using a method as detailed above, suitable for use in a graphene layer making process as detailed further above.

The step of chemical vapour deposition to form the graphene layer can be carried out using a carbon source in the gas phase under formation of the porous graphene layer on the surface of the catalytically active substrate, the pores in the graphene layer in situ being formed due to the presence of the catalytically inactive domains, using methane gas as carbon source, preferably in the co-presence of argon and hydrogen gas under reduced pressure, preferably below 50 Torr, preferably below 5 Torr, during a time span of preferably in the range of 10-120 minutes, preferably below 60 minutes, more preferably below 50 minutes, most preferably below 35 minutes. This graphene layer deposition process preferably takes place during a time span allowing for the generation of a graphene layer of average thickness of more than 5 nm, preferably in the range of 8-12 nm.

The porous graphene layer can be removed from the catalytic substrate, and can furthermore be applied to a porous, preferably nonwoven or fabric supporting substrate, preferably in that for removal of the graphene layer first a supporting carrier layer is applied to the graphene layer on the surface opposite to the catalytic substrate and the sandwich of this carrier layer and graphene is removed from the catalytic substrate, and then this structure can be directly or indirectly applied to the porous, preferably nonwoven or fabric supporting substrate, followed by removal of the temporary carrier layer if needed.

Prior to removal of the graphene layer, the layered structure of the catalytic substrate with the catalytically inactive domains and the as-grown graphene layer can be preferably subjected to a pre-leaching process weakening or removing the bond between the graphene layer and the catalytic substrate and/or the catalytically inactive domains.

Preferably this pre-leaching step includes the formation of an oxide layer at least partially, preferably essentially completely between the graphene layer and the catalytic substrate and the removal of the catalytically inactive domains.

The pre-leaching step can be carried out by subjecting the substrate with the graphene layer to a basic or acidic environment, preferably in water, more preferably at a pH of less than 6 or more than 7, preferably more than 10, more preferably at a pH of more than 12.

Most preferably for the pre-leaching an aqueous solution of 0.01-0.5 M NaOH is used, preferably for a time span in the range of 10-60 minutes at a temperature in the range of 40-60° C., optionally followed by rinsing with water and drying.

The graphene layer can also be removed, preferably after a pre-leaching step, using electrochemical methods, e.g. by immersing the layered structure of the catalytic substrate with the catalytically inactive domains and the graphene layer in an electrolyte and applying electrochemical potential to the substrate relative to a counter electrode in the same electrolyte.

The graphene layer after or for removal from the catalytic substrate can be attached to a porous, preferably nonwoven or fabric supporting substrate, preferably having a characteristic filament diameter in the range of 200-2000 nm, preferably in the range of 300-1000 nm, in particular with a standard deviation in the range of less than 500 nm,
  and/or having a characteristic pore size in the range of 500-50000 nm, preferably in the range of 1000-10000 nm, in particular with a standard deviation in the range of less than 1000 nm.

Preferably the nonwoven or fabric supporting substrate is attached to the graphene layer using solvent induced bonding or heat bonding, wherein preferably adhesion to nonwoven is effected using isopropanol-mediated adhesion plus annealing and/or heat treatment. According to a third aspect of the invention, it relates to a graphene layer, preferably on at least one supporting substrate, obtainable or obtained using a method as detailed above. Typically such a graphene layer has a thickness in the range of less than 50 nm, preferably in the range of 1-20 nm, in particular in the range of 5-15 nm or 7-12 nm and/or it has an areal porosity in the range of at least 10%, preferably at least 15%, more preferably of at least 20% or at least 25% or at least 30% or at least 40%.

According to yet another aspect of the present invention it relates to a piece of textile or apparel, e.g. clothing (e.g. jacket, trousers, gloves, hats, and the like) having at least one graphene layer made using a method as given above, preferably in the form of a water resistant and/or water repellent and/or breathable clothing.

Last but not least the present invention relates to the use of a graphene obtained using a method as detailed above or as detailed above as a graphene layer as such, as a semipermeable membrane, in particular for textile applications in the field of clothings, or in the technical field, in particular for providing water barrier in electronics and/or mobile devices.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIGS. 3a-3c show schematic views of a formation of W nanoparticles on the catalytic substrate in which a thin film of W is deposited on the binary metal alloy substrate in FIG. 3a and subsequently annealed at a relatively high temperature, leading to nanoparticles of W, illustrated in a cut view in FIG. 3b and in a top view in FIG. 3c;

FIG. 4 shows a schematic of W nanostructures, including nanoparticles and nanowalls, in which a thin film of W has been deposited on the binary metal alloy substrate and subsequently annealed at a relatively low temperature, leading to nanostructures of W illustrated in a top view;

FIGS. 5a-5b shows a schematic of a grown porous graphene layer atop exposed Cu—Ni alloy substrate, illustrated in a cut view in FIG. 5a and in a top view in FIG. 5b;

FIG. 6 shows a schematic of a grown highly porous graphene layer atop exposed Cu—Ni alloy substrate including W nanoparticles and nanowalls;

FIG. 14 shows a graph indicating the dependence of initial thickness of Ni on porosity and thickness in which 4-nm-thick W is used and a duration of growth is 30 mins;

FIGS. 15a-15c show representative SEM images of highly porous graphene grown on (FIG. 15a) 50-nm-thick Ni, (FIG. 15b) 150-nm-thick Ni, and (FIG. 15c) 300-nm-thick Ni;

FIG. 16 shows a graph indicating the dependence of growth time on porosity and thickness in which 50-nm-thick Ni and 4-nm-thick W are used;

FIGS. 17a-17c show representative SEM images of highly porous graphene grown for (FIG. 17a) 30 min, (FIG. 17b) 45 min, and (FIG. 17c) 60 min;

FIG. 18 shows a graph indicating the dependence of porosity on thickness of W in which 50-nm-thick Ni is used and a duration of growth is 30 min;

FIGS. 19a-19c show representative SEM images of highly porous graphene grown with (FIG. 19a) 2-nm-thick W, (FIG. 19b) 4-nm-thick W, and (FIG. 19c) 6-nm-thick W;

FIGS. 20a-20b show representative SEM images of (FIG. 20a) before and (FIG. 20b) after pre-leaching process;

FIGS. 21a-21b show photographs of (FIG. 21a) before a mechanical delamination in which thermal release tape (TRT) is applied onto as-grown graphene and (FIG. 21b) after the mechanical delamination in which TRT is peeled off along with the graphene film from the Cu—Ni alloy;

FIGS. 22a-22b show representative SEM images of an assembly of highly porous graphene with porous polyurethane non-woven with (FIG. 22a) low magnification and (FIG. 22b) high magnification;

FIGS. 23a-23c show photographs of (FIG. 23a) porous polyurethane non-woven, (FIG. 23b) an attachment of large-scale highly porous graphene with porous polyurethane non-woven, and (FIG. 23c) an assembly of large-scale highly porous graphene with porous polyurethane non-woven;

FIGS. 24a-24c show representative SEM images of highly porous graphene after (FIG. 24a) first, (FIG. 24b) second, and (FIG. 24c) third growth on the same Cu—Ni alloy substrate;

FIGS. 26a-26f show SEM images of highly porous graphene on polyurethane (FIGS. 26a-26c) before and (FIGS. 26d-26f) after water entry pressure test at 3 bar.

DESCRIPTION OF THE INVENTION

Figure 1:
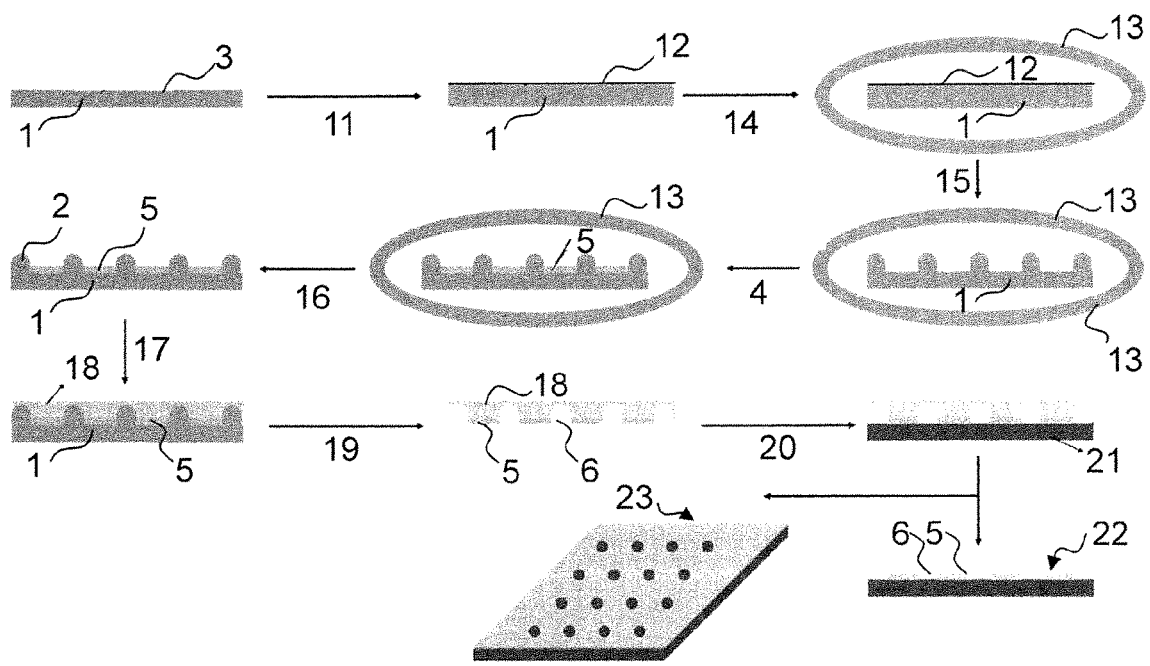
FIG. 1 shows a schematic representation of the growth procedure of porous graphene.

FIG. 1 schematically illustrates the proposed method in the individual steps. A catalytic copper/nickel substrate is in a first step on the surface provided with a layer 12 of catalytically inactive material, in particular a layer 12 of tungsten in a tungsten deposition step 11. Subsequently this coated substrate 1 is optionally introduced into an enclosure in step 14 and is then subjected to a step of thermal annealing under reducing conditions. The result is the generation of the pattern of catalytically inactive domains 2 on the surface of the catalytic substrate 1. In the following step 4 of growth of the graphene layer on the substrate again in the optional enclosure 13 the substrate is subjected to chemical vapour deposition of methane leading to the formation of the porous graphene layer 5, interrupted by the catalytically inactive domains 2 locally forming the holes for the future porosity. In the following step 16 of removal of the enclosure (if used at all), this layered substrate is freed and then subjected to a PMMA coating step 17. A substrate layer 18, in this case a PMMA coating, is applied, e.g. by spin coating or curtain coating. Prior to this step pre-leaching can be carried out as will be described further below. Subsequently there is the step of substrate removal 19, again using mechanical and/or electrochemical methods as further detailed below. Then this sandwich of the coating layer 18 and the porous graphene layer 5 is applied to the desired carrier substrate 21, e.g. nonwoven or porous fabric. This is illustrated in a cross-section view 21 and in a top view 23 schematically illustrating with the dots the porosity of the graphene layer.

Figure 2A:
FIGS. 2a-2c show schematic cut views of a commercial Cu foil in FIG. 2a, of a formation of Cu—Ni alloy catalytic substrate in which a Ni film is deposited atop a commercial Cu foil in FIG. 2b and subsequently a bi-layered catalyst substrate is annealed at an elevated temperature, leading to a binary metal (Cu—Ni) alloy catalytic substrate in FIG. 2c.
Figure 2B:
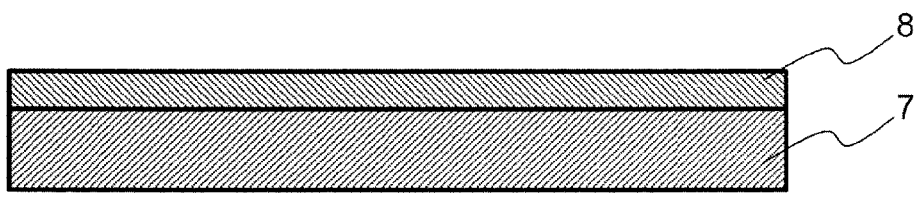
Figure 2C:

Binary metal alloy, which provides high catalytic effect on a decomposition of hydrocarbon gas and preferred growth dynamics, is used to synthesize thick porous graphene and thick highly porous graphene. For example, a varied thickness of nickel film 8 is deposited with thickness in the range from 50 to 300 nm by physical vapour deposition on metal substrate 7, Cu, which is the most widely used catalyst. Afterwards, bi-layered Ni/Cu catalyst is annealed to convert into Cu—Ni alloy substrate 1 in the CVD reactor, as illustrated in FIGS. 2a-2c.

After the transformation of Cu—Ni alloy, to measure the actual Ni content at the surface of the alloy, X-ray photo-electron spectroscopy (XPS) was performed on a Sigma 2 spectrometer (Thermo Scientific) using a polychromatic Mg Kα X-ray and hemispherical analyser where binding energy was calibrated taking C 1 s=284.8 eV. The results of Ni contents are as following: 0.43% for 50-nm Ni, 0.68% for 150-nm Ni, 1.43% for 300-nm Ni, and 2.73% for 500-nm Ni.

An evolution of catalytically inactive materials on the substrate can be distinguished by process temperature as shown in FIGS. 3a-3c and 4. In FIGS. 3a-3c, firstly, a thin film 12 of the catalytically inactive material is deposited from 1 to 10 nm by physical vapour deposition. Subsequently, this resulting material is annealed in the CVD reactor—at high temperature, above 900° C. Nanoparticles of the catalytically inactive material are formed without any lithography and etching processes. Size and density of the nanoparticles of the catalytically inactive material can be controlled by the thickness of the initially deposited film 12 of the catalytically inactive material, annealing temperature, pressure, and duration of the annealing process.

In FIG. 4, like before in FIGS. 3a-c, a thin film 12 of the catalytically inactive material was deposited from 1 to 10 nm by physical vapor deposition. Subsequently, this resulting material was annealed in the CVD reactor at high temperature, below 900° C. Lower temperature annealing creates a nanowall structure of catalytically inactive material, along with the nanoparticles. Such a combination of nanoparticle and nanowall results in higher porosity than only nanoparticles because the porosity of the graphene layer 5 is roughly proportional to the coverage of catalytically inactive material. The decrease in the annealing temperature allows the catalytically inactive material to partially de-wet, instead of complete de-wetting. Therefore, a new structure of the catalytically inactive material topology is achieved without any lithography and etching processes. Furthermore, a ratio of the nanoparticle and nanowall and the shape, size, and density of nanoparticle and nanowall of the catalytically inactive material can be controlled by the thickness of the initial film of the catalytically inactive material, the annealing temperature, the pressure, and the duration of annealing process.

A CVD process is carried out to produce either porous graphene or highly porous graphene by synthesizing graphene on these two types of the above catalyst substrate, except the morphology of resulting nanostructures of catalytically inactive materials, as depicted in FIGS. 5a-5b (porous graphene) and 6 (highly porous graphene).

Figure 7A:
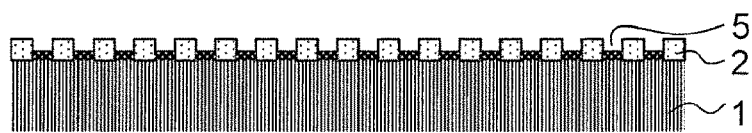
FIGS. 7a-7c show a schematic of pre-leaching process in which W nanoparticles and nanowalls can disappear when as-grown graphene sample is immersed in base solution and a native oxide layer at a surface of the Cu—Ni alloy substrate is formed, wherein in FIG. 7a a cut view of the substrate with the W nanoparticles and the formed porous graphene layer is shown, in FIG. 7b the layer after immersion in base solution and with the native oxide layer in a side cut, and in FIG. 7c in a top view.
Figure 7B:
Figure 7C:

Depending on the catalytically inactive material, a (chemical) bonding between edges of graphene and the catalytically inactive material can be stronger than the bonding between graphene and the substrate. When such strong bonding takes place, pre-leaching process, which will be dealt with later, can be advantageous. As a result, not only is the catalytically inactive material dissolved away, but also a native oxide layer 9 of the substrate 1 is generated, leading to a relaxation of bonding between graphene 5 and the substrate 1 in FIGS. 7a-7c. It helps to delaminate the graphene layer 5 from the substrate 1 and a re-use of the substrate is possible.

As-grown porous graphene and highly porous graphene can also be removed via electrochemical or mechanical approaches, instead of etching the metal catalyst, schematically indicated in FIGS. 8a-8c and 9a-9b.

Figure 8A:
FIGS. 8a-8c show a schematic of mechanical delamination of the graphene from the Cu—Ni alloy, wherein in FIG. 8a the layer after immersion in base solution with the native oxide layer is shown in a cut view, in FIG. 8b a cut view in which an adhesive material layer 10 is attached to the porous graphene layer, and in FIG. 8c the mechanical removal of the graphene layer from the substrate is shown.
Figure 8B:
Figure 8C:
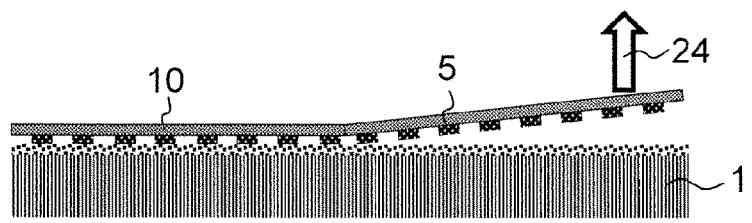

In FIGS. 8a-8c, after a pre-leaching process and formation of oxide layer 9, an adhesive material layer 10 such as based on PMMA, PVA, PC or others can be coated on as-grown porous graphene 5 and highly porous graphene 5 on the substrate 1. Then, this material composite consisting of the porous graphene layer 9 on this supporting layer 10 is removed by applying a shearing force as schematically illustrated by arrow 24. Subsequently it can be immersed in an electrolyte such as a base or acid solution with electrically connected metal. The supporting material 10 with porous or highly porous graphene can be delaminated by a generation of hydrogen or oxygen bubbles.

Figure 9A:
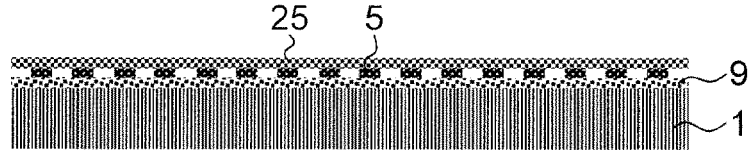
FIGS. 9a-9b show a schematic of electrochemical delamination of the graphene from the Cu—Ni alloy wherein in FIG. 9a a cut view is shown in which the substrate with the porous graphene layer and the oxide layer with a supporting layer on the graphene layer is shown, and in FIG. 9b the step of immersion in an electrolyte.
Figure 9B:
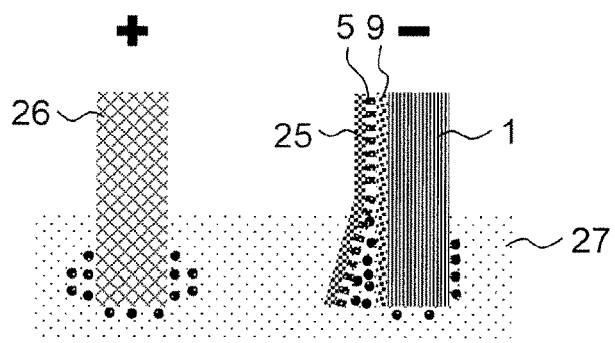

In FIGS. 9a-9b, after a pre-leaching process, a supporting material 25 such as PMMA, PVA, PC or others or adhesive material such as thermal release tape, pressure sensitive tape or others can be directly applied on as-grown porous and highly porous graphene 5 on the substrate 1. Then, porous and highly porous graphene 5 with the supporting or adhesive material 25 can be delaminated by mechanical force 24 is also illustrated in FIG. 8c because of the relaxation of bonding between graphene 5 and the metal catalyst 1, resulting from the generation of native oxide 9 during the pre-leaching process. In both cases, porous and highly porous graphene 5 can be transferred on arbitrary substrate 10/25 such as polymer substrate, porous substrate, glass, wafer or others by dissolving support material or detaching the adhesive material.

For the electrolytic removal the substrate 1 with or without oxide layer 9 and the graphene layer 5 and a further substrate layer 25 is immersed in an electrolyte 27 as is a counter-electrode 26, and the required electrical potential is established between the substrate 1 and this counter-electrode 26. This leads to the delamination of the graphene layer 5 on the substrate 25, which can then subsequently be taken out of the electrolyte for further use.

General Scheme of Preparation of Nanostrucuture of Catalytically Inactive Material on Binary Metal Alloy:

Physical vapor deposition (sputtering, FHR, Pentaco 100, Ni purity 99.95% or E-beam evaporator, Evatec), was conducted to deposit nickel film on base catalyst substrate (Copper foil, 0.025 mm, 99.8%, Product No. 49686, Alfa Aesar) for obtaining a binary metal alloy (Cu—Ni alloy). This was achieved by thermal annealing at high temperature (800-1000° C.) in a CVD system (Graphene Square. Inc, TCVD-RF100CA). A concentration of Ni at the surface of the binary metal alloy can be controlled by the thickness of the initial Ni film and/or the annealing temperature. For example, a 50-nm-thick Ni film provides 0.43% by weight in 99.57% copper of the substrate at 1000° C. for a timespan in the range of 10 minutes to 60 minutes. As an increase in the thickness of Ni film, the concentration of Ni increases up to 1.43% when 300 nm Ni initial layer thickness on the copper substrate is used.

A thin film 12 of catalytically inactive material (tungsten) is deposited on the binary metal alloy 1 by physical vapor deposition such as sputter or e-beam evaporation or potentially spraying nanoparticles onto the binary metal alloy. Afterwards, thermal annealing process is performed at a varied temperature (700-950° C.) to convert the thin film into a nanostructure such as nanoparticles and/or nanowalls. This can be explained by a solid-state de-wetting in which very small amount of material can laterally diffuse on a surface of substrate via thermal annealing, leading to nanoparticles and/or nanowalls through agglomeration and Ostwald ripening.

Figure 10:
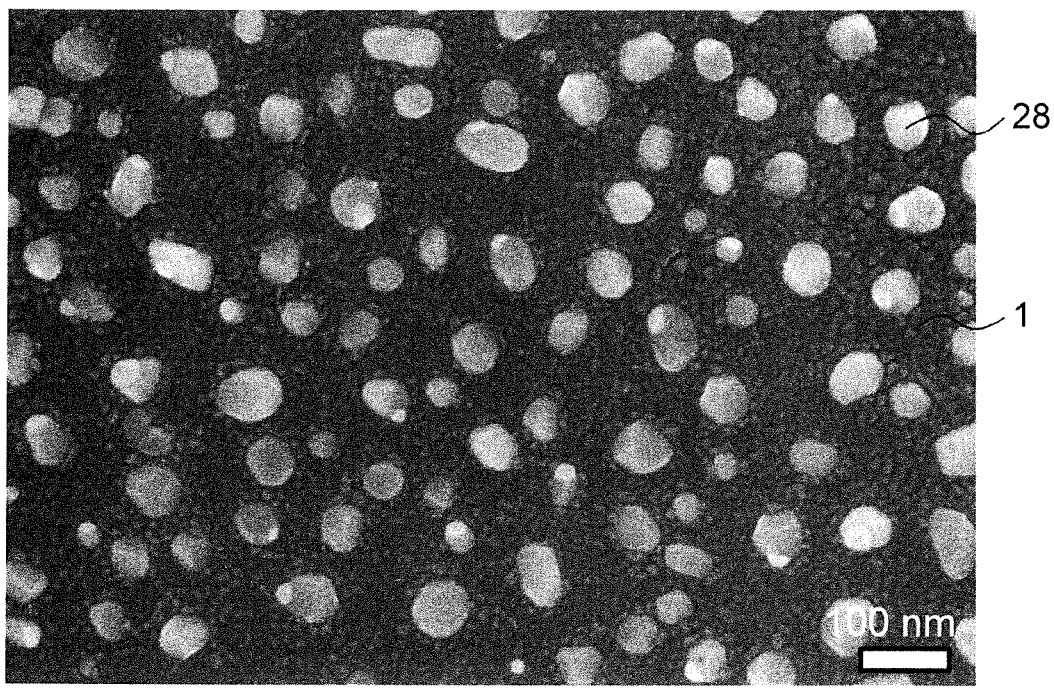
FIG. 10 shows a representative scanning electron microscopy (SEM) image of W nanoparticles atop the Cu—Ni alloy substrate.
Figure 11:
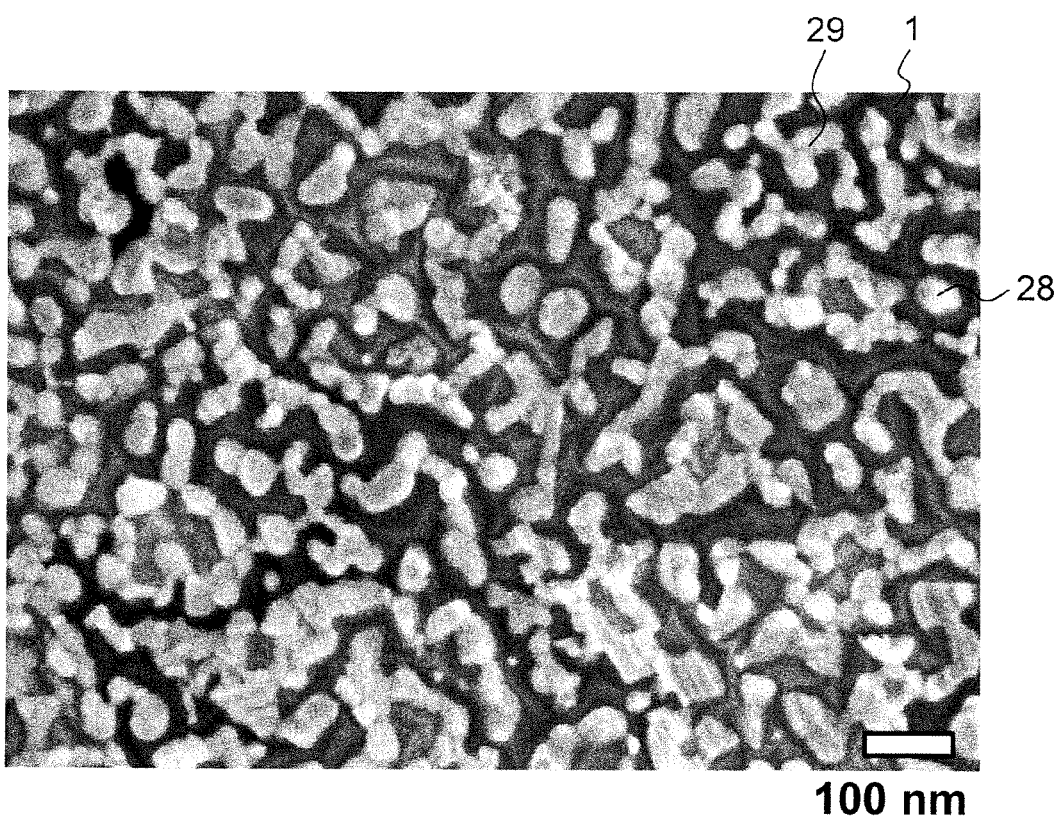
FIG. 11 shows a representative SEM image of the nanostructures of W atop the Cu—Ni alloy substrate.

As an example, at higher temperature (above 900° C.), nanoparticles of W on Cu—Ni alloy mostly are successfully demonstrated in FIG. 10. When temperature is below 900° C., a mixture of W nanoparticles and W nanowalls on the Cu—Ni alloy is created as given in FIG. 11.

General Scheme of CVD Synthesis of Porous and Highly Porous Graphene:

In order to synthesize porous and/or highly porous graphene layers, the binary metal alloy 1 with the thin film 12 of catalytically inactive material (tungsten) is placed in a CVD system.

The bi-layered metal catalyst is annealed in an Ar/$H_2$ environment to form the tungsten-based nanostructures. Afterwards, porous and/or highly porous graphene CVD is grown by an introduction of a certain amount of carbon feedstock (ethylene, acetylene, or methane) to ensure the full coverage of graphene atop the binary metal alloy, yet not on the tungsten domains. The tungsten domains may convert into carbide material, which is the preferred form to absorb carbon precursor instead of growing graphene atop the tungsten.

The porosity of graphene can be controlled by the morphology of the W nanostructure which can be influenced by annealing and growth temperature. A thickness of porous and highly porous graphene can be controlled by simply growth time, process pressure, or amount of carbon feedstock.

Figure 12:
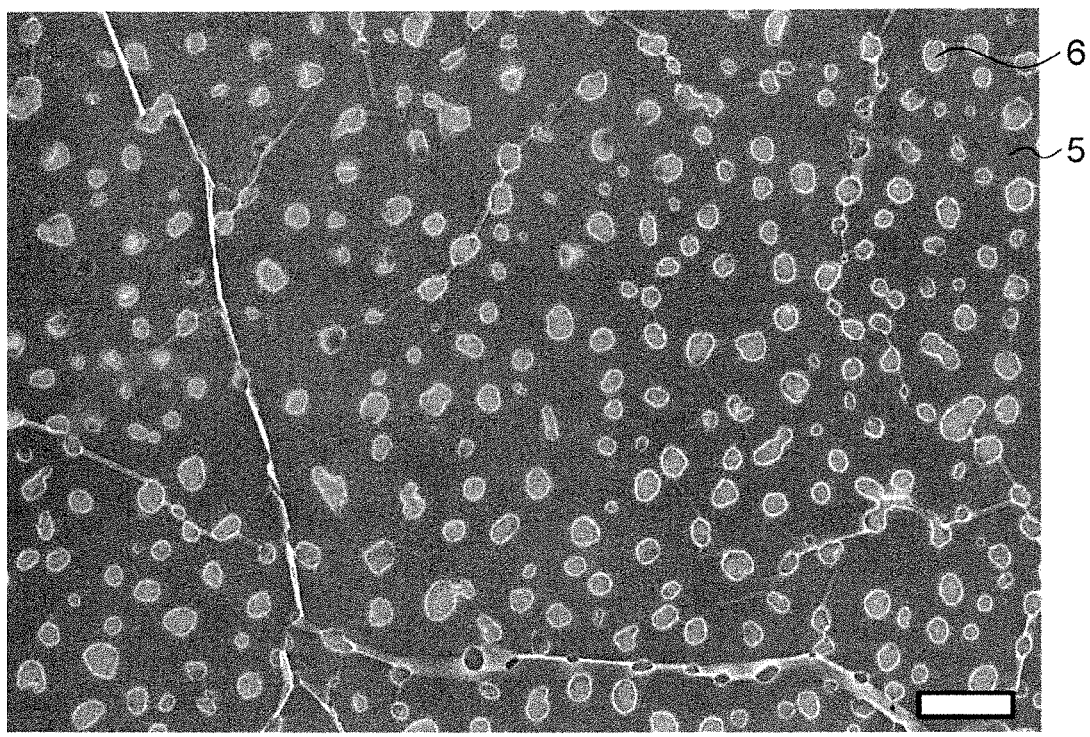
FIG. 12 shows a representative SEM image of porous graphene transferred on $SiO_2$/Si.

For example, to synthesize porous graphene, the bi-layered W/Cu—Ni alloy is annealed to convert the thin film of W into W nanoparticles in FIG. 10 at 930° C. with 800 sccm of Ar and 40 sccm of $H_2$ under 4 Torr. After the completion of W nanoparticle formation, 40 sccm of $CH_4$ is introduced into the chamber with 300 sccm of Ar and 40 sccm of $H_2$ under 2 Torr. The growth is carried out for 10 min, producing 5-nm-thick porous graphene. FIG. 12 shows porous graphene transferred onto $SiO_2$/Si substrate, displaying relatively circular shape of pores in graphene layer.

Figure 13:
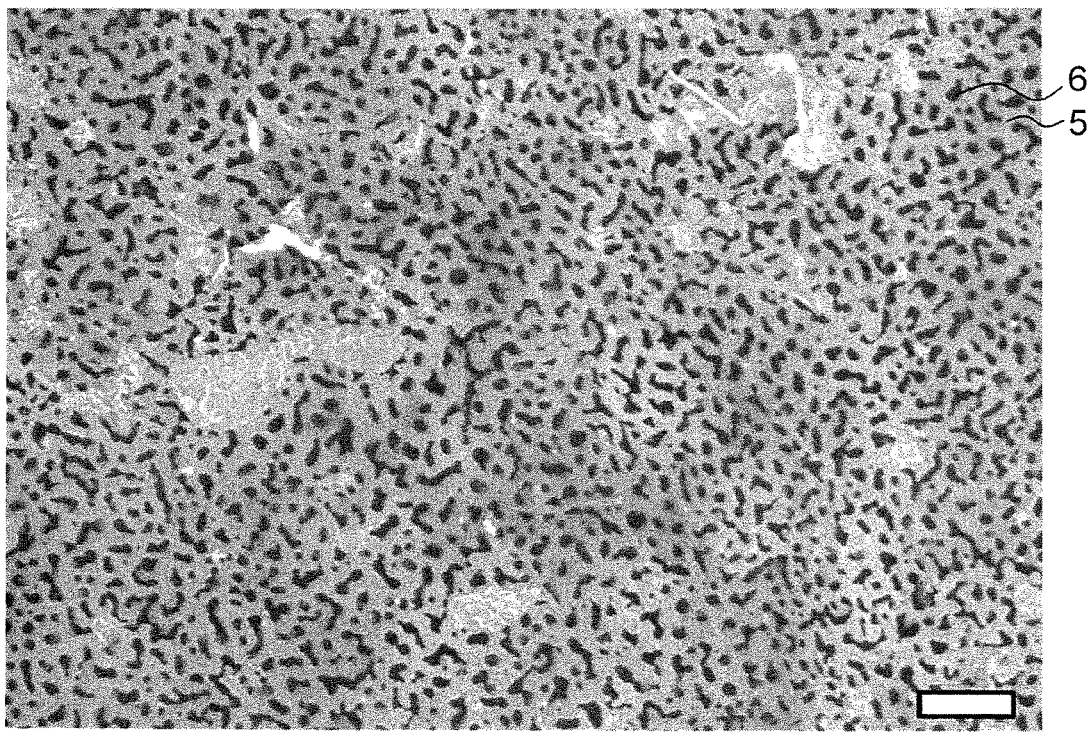
FIG. 13 shows a representative SEM image of highly porous graphene transferred on $SiO_2$/Si.

For the synthesis of highly porous graphene, the annealing and growth temperature is decreased down to 800° C. After the completion of W nanostructure by thermal annealing at 800° C. with 800 sccm of Ar and 40 sccm of $H_2$ under 4 Torr in FIG. 11, the synthesis of highly porous graphene is performed for 30 min with 40 sccm of $CH_4$, 300 sccm of Ar, and 40 sccm of $H_2$ under 4 Torr, resulting in 10-nm-thick highly porous graphene. FIG. 13 shows free-standing highly porous graphene on $SiN_x$ membrane chip. Compared with porous graphene, very dense, small, and irregular shape of pores is observed.

Characterization of Porosity and Thickness of Highly Porous Graphene:

Porosity and thickness of porous and highly porous graphene can be influenced by growth parameters for example, initial thickness of Ni film, initial thickness of W thin film, and growth time.

Ni Thickness:

In order to investigate the effect of the Ni film 8 on the porosity and thickness, a varied Ni thickness from 50 to 300 nm is deposited on the Cu foil 7 by physical vapor deposition and annealed at 1000° C. for a formation of Cu—Ni alloy 1. Highly porous graphene 5 is grown on the alloy based on 4-nm-thick W film (0.43%, 0.68%, and 1.43% of Ni content for 50, 150, and 300 nm, respectively, which was annealed at 1000° C. for 1 hour) at 800° C. for 30 min with 40 sccm of $CH_4$, 300 sccm of Ar, and 40 sccm of $H_2$ under 4 Torr. Afterwards, the catalyst is etched away and the resulting film is transferred onto a SiN membrane to precisely observe porosity and thickness. SEM images in FIGS. 15a-15c show free-standing highly porous graphene grown on Cu—Ni alloy from (a) 50-nm-thick, (b) 100-nm-thick, and (c) 150-nm-thick Ni film. Cu—Ni alloy (50 nm Ni) showed highest porosity (greater than 30%) and thickest graphene film (~6 nm). As Ni thickness increases, graphene layer porosity and thickness both decrease down to 20% and 4 nm, respectively in FIG. 14. The porosity here is defined as a ratio of total area of pore to total projected area.

Growth Time:

To illustrate the effect of growth time on the porosity and thickness, various durations are applied from 30 to 60 min to grow highly porous graphene on Cu—Ni alloy from 50-nm-thick Ni and 4-nm-thick W film at 800° C. for 30 min with 40 sccm of $CH_4$, 300 sccm of Ar, and 40 sccm of $H_2$ under 4 Torr (0.43% of Ni content for 50-nm-thick Ni, which was annealed at 1000° C. for 1 hour)) Afterwards, the highly porous graphene was transferred onto a SiN membrane to observe porosity and thickness. FIGS. 17a-17c show representative SEM images of free-standing highly porous graphene grown for (a) 30 min, (b) 45 min, and (c) 60 min. As growth duration increases, highly porous graphene gets thicker from 6 to 11 nm, whereas porosity of highly porous graphene decreases from 30 to 5% due to graphene covering W nanostructures, as illustrated in FIG. 16.

W Thickness:

In order to investigate an effect of W film thickness on the porosity and thickness of the graphene layer, a varied W layer thickness from 2 to 6 nm has been used, together with 50-nm-thick W film (0.43% of Ni content for 50-nm-thick Ni, which was annealed at 1000° C. for 1 hour)) and 30-min-long growth at 800° C. with 40 sccm of $CH_4$, 300 sccm of Ar, and 40 sccm of $H_2$ under 4 Torr. After growth of highly porous graphene, the resulting film was transferred onto a SiN membrane to observe porosity and thickness. SEM images in FIGS. 19a-19c show free-standing highly porous graphene grown on Cu—Ni alloy with (a) 2-nm-thick, (b) 4-nm-thick, and (c) 6-nm-thick W film. 6-nm-thick W thin film achieved highest porosity (around 40%) for at the same time thickest graphene film (~10 nm). In case of 2-nm-thick W, porosity and thickness are significantly reduced because graphene was grown on W nanostructures as illustrated in FIG. 18.

Delamination of Porous or Highly Porous Graphene:

After growth of porous or highly porous graphene, the graphene needs to be delaminated from the catalyst substrate in a non-destructive way to re-use the catalyst for growing the porous or highly porous graphene again. To this end, two different methodologies may be used: mechanical and electrochemical delamination.

In both cases, the surface of the catalyst included the nanostructures of W, which tends to have stronger bonding with graphene than the catalyst (Cu—Ni alloy). As a result, a mechanical delamination may not be possible as well as an electrochemical delamination may pose problems such as high voltage and prolonged duration. To tackle these issues, a pre-leaching process can applied in which as-grown porous or highly porous graphene is immersed in a low concentration of alkaline solution (0.1 M NaOH). As shown in FIG. 20 B, the nanostructures of W have completely disappeared within 20 min, compared with as-grown sample in FIG. 20A. Furthermore, the surface of the catalyst is slightly oxidized, resulting in a relaxation of bonding between the graphene and the catalyst. It requires at least 12 hours to mechanically delaminate pristine (non-porous) graphene, meaning if there are no pores in graphene, from the catalyst because oxidizing the surface of the catalyst needs such a long duration. But in our case, pores in graphene are a pathway for oxidants to penetrate into the interfacial gap between the graphene and the surface and therefore, we could drastically decrease pre-treatment time to decouple the graphene from the catalyst.

After pre-leaching process, adhesive material (here, thermal release tape) is applied atop the sample in FIG. 21A. In order to improve adhesion between the graphene and the tape, a laminator is used. Given the weak interaction between the graphene and the surface of the catalyst, the tape including porous graphene or highly porous graphene can be directly and mechanically delaminated from the catalyst substrate. As shown in FIG. 21 B, the graphene was peeled off along with the tape and there is no remaining graphene atop the surface of the catalyst.

Further to the mechanical delamination, a condition for an electrochemical delamination could be relaxed with relatively low voltage (3-5 V) and short amount of time (1-3 min). Polymer supporting material such as PMMA or others is firstly coated atop the sample. Polymer coated the sample is immersed with a varied angle (30-90°) into electrolyte, for example, NaOH with counter electrode (Pt or graphite). DC voltage is applied to the sample as a cathode and the counter electrode as an anode. When the voltage is applied, hydrogen bubbles are gently generated at the edge of the cathode, and subsequently these bubbles can squeeze into the interface between the graphene and the surface of the catalyst enabling the separation of the graphene from the surface of the catalyst.

Assembly of Porous Graphene or Highly Porous Graphene with Porous Polymeric Supporting Material:

An assembly of porous graphene or highly porous graphene onto porous polymeric supporting material such as porous polyurethane (PU) or non-woven fabric is performed. Porous PU non-woven has a characteristic pore width of 1 µm to 10 µm and non-woven material poses a characteristic pore width of 25 µm on average (the characteristic pore width is defined as a width of the individual topmost pore in the non-woven material on average. For the determination of the characteristic pore width a SEM image of non-woven material was taken to see the topmost pore in the non-woven. Then the characteristic width of pore is measured by ImageJ program. Also here the widest width of pores is defined as the characteristic width. The geometry of the pore openings formed by the crossing of the uppermost layer of filaments is relevant as the graphene is in direct contact with and supported by the uppermost filament structures. The dimension of the nonwoven pore therefore represents the region of free-standing graphene between points of contact—the smaller the distance of free-standing graphene would give greater mechanical support and strength against rupture caused by bending and strain.

In order to assemble the graphene with the porous polymeric supporting material, two different methodologies were conducted: (1) isopropanol (IPA)-mediated adhesion and (2) heat treatment. IPA is used to bond the graphene onto the porous material. For example, porous PU non-woven is placed atop as-grown porous or highly porous graphene attached to the catalyst. The IPA is gently dropped on the porous PU to make them wet. As the IPA evaporates, an intimate contact between the graphene and the porous PU is achieved. To further improve the adhesion, the graphene with the porous PU is annealed at 120° C. for 10 min. SEM images in FIGS. 22a-22b show highly porous graphene transferred onto the porous PU non-woven. Highly porous graphene is supported on filaments of the non-woven and the highly porous graphene layer is suspended across the open areas between filaments, showing a difference in contrast between pore and basal plane of graphene and also the filament.

Heat treatment can also be utilized to strongly adhere the graphene with the porous material. For instance, as-grown porous or highly porous graphene on the catalyst is pre-heated at an elevated temperature (150-180° C.) for 1 min. Afterwards, the non-woven fabric materials (e.g. polyurethane or other thermoplastic polymers, such as polyester), are laid on the preheated graphene sample. The heat treatment is performed for 10 min with a certain amount of pressure (e.g. 100 g mass placed on top of the circular assembly having a diameter of 10 cm). By using this method, large-scale sample of highly porous graphene (7×7 cm) can be transferred onto the PU non-woven in FIGS. 23a-23c.

Finally, the assembled resulting sample can be mechanically or electrochemically delaminated or the catalyst can be dissolved away in a conventional chemical etching method.

Re-Growth of Highly Porous Graphene:

Re-growth of highly porous graphene is performed on the used Cu—Ni alloy where highly porous graphene was delaminated. Prior to the re-growth, a thin film of W is again deposited by physical vapor deposition because during pre-leaching process, W nanostructures were dissolved away. The bi-layered metal catalyst (W/used Cu—Ni alloy) is annealed in Ar/$H_2$ environment to achieve the tungsten-based nanostructure and subsequently porous and/or highly porous graphene CVD is repeatably grown with an introduction of hydrocarbon gas in FIGS. 24a-24c. Therefore, the binary metal alloy can be reused with the non-invasive delamination methods mentioned above and re-deposition of a thin film of W.

Detailed Working Examples

Making of Cu/Ni Substrate:

A Cu—Ni alloy catalyst was formed for synthesizing thick highly porous graphene. As-received Cu foil without any treatment (0.025 mm, 99.8%, Product No. 49686, Alfa Aesar) was coated a film of Ni by physical vapor deposition (PVD, sputtering or e-beam evaporation). Ni film (50-500 nm in thickness or 0.01-2.2 µm in thickness) was coated by using sputtering (FHR, Pentaco 100, Ni purity 99.95%) under $6 \times 10^{-3}$ mbar with 200 sccm of Ar and 0.25 kW of plasma power for 85-18700 sec or 425 to 4250 sec, depending upon the thickness of Ni film. The bi-layered Ni/Cu was placed in low-pressure chemical vapor deposition (LP-CVD, Graphene Sqaure. Inc, TCVD-RF100CA) system to anneal. Temperature of a furnace was first ramped up to 1000° C. for 60 min with 50 sccm of $H_2$. Further, the annealing process was performed at 1000° C. for 15 min in $H_2$ environment to prevent unwanted oxidation. Afterward, a formation of Cu—Ni alloy was completed by inter-diffusing in bulk state, resulting from being completely soluble in the other. In order to rapidly decrease the temperature down to room temperature, the furnace was moved to downstream position. A cooling rate of 50° C./min resulted while maintaining the same level of $H_2$.

Making of W Nanostructures on Cu/Ni Substrate:

After the formation of the Cu—Ni alloy, a thin film of W (2-10 nm) was deposited on the Cu—Ni alloy by using sputtering (FHR, Pentaco 100, W purity 99.95%). The deposition was carried out with 0.25 kW of DC power and 100 sccm of Ar under $3 \times 10^{-3}$ mbar for 15 to 75 sec, leading to a varied thickness.

As-prepared W/Cu—Ni alloy was placed in the middle of furnace in the LP-CVD system. The chamber was pumped out until 0.05 mTorr by turbo molecular pump to remove any residual gases and then the pressure was increased up to 45 mTorr with 50 sccm of Ar. Afterward, the chamber was purged out with $N_2$ for 5 min and vacuumed down to 45 mTorr. The furnace was heated up to the growth temperature of 750-950° C. or 800-950° C. with the supply of 800 sccm of Ar and 40 sccm of $H_2$ under 4 Torr. Once the target temperature was reached, the temperature was maintained for 10 min to stabilize. In the meantime, the thin film of W was transforming into W nanostructures due to solid-state de-wetting. Since there is no solid solubility between Cu—Ni alloy and W, different morphologies of W nanostructures can be obtained without any pre-lithography processes.

Making of Graphene Layer:

When the desired morphology of W was achieved, the synthesis of highly porous graphene was then carried out with the introduction of 40 sccm of $CH_4$, 40 sccm of $H_2$, and 300 sccm of Ar under 4 Torr for 30 min. Then, the temperature was programmed to cool down to room temperature under a mixture of 800 sccm of Ar and 40 sccm of $H_2$.

Pre-Leaching Step:

After the CVD synthesis of highly porous graphene, a pre-leaching process was carried out to remove the W nanostructures. As-synthesized highly porous graphene was immersed in 0.1 M NaOH which was heated to 40° C. for 10-20 min, depending on the initial thickness of W thin film. The highly porous graphene/Cu—Ni alloy sample was then immersed in DI-water for 10 min to rinse and subsequently dried by flushing with N2 gas.

Applying Carrier Substrate Layer:

After the pre-leaching process, Poly(methyl methacrylate) (PMMA, 950k, AR-P 672.03) was spin-coated on the pre-leached highly porous graphene sample with 4000 rpm for 40 sec. The PMMA/highly porous graphene sample was then baked at 110° C. for 1 min.

Graphene Layer Removal:

For ease of characterization the Cu—Ni alloy catalyst substrate was dissolved away by floating the sample on a 0.5 M ammonium persulfate ((NH4)2S2O8, APS, 248614, Sigma Aldrich). The PMMA/highly porous graphene was rinsed with DI-water for 60 min and the sample was transferred onto the substrate of interest for example Si wafer having 280-nm-thick SiO2 to investigate the highly porous graphene. The PMMA layer was then removed by acetone.

Assembly of Highly Porous Graphene Onto Porous Non-Woven Material:

An assembly of highly porous graphene with porous non-woven material such as polyurethane (Finetex ENE, DT007) was carried out. After the pre-leaching process, the non-woven material was adhered onto the highly porous graphene in various ways with regard to thickness of the non-woven material: (1) Isopropanol (IPA)-mediated adhesion and (2) heat treatment.

The assembly of highly porous graphene with thin porous non-woven material (approximately 1.2 µm of characteristic hole in and 9 µm in thickness) was achieved in the IPA-mediated method. The thin non-woven material was directly laminated on pre-leached highly porous graphene. The IPA was gently applied on the laminated non-woven/highly porous graphene until they were completely wet. The laminated sample then left to dry at ambient condition. As the IPA evaporates, the interfacial contact between the non-woven material and the highly porous graphene becomes stronger. After the completion of dry process, the laminated sample was baked on hotplate (IKA, C-Mag HS 7) at 120° C. for 10 min to further improve the adhesion.

The assembly of highly porous graphene with relatively thick porous non-woven material (greater than 10 µm of characteristic hole width and greater than 100 µm in thickness) was achieved by heat treatment and melt adhesion. Thick non-woven materials are not suitable for the IA method due to deformation of the non-woven. Pre-leached highly porous graphene was heated on a hotplate (IKA, C-Mag HS 7) at elevated temperatures (150-180° C.) for 1 min. After the pre-heat process, the thick non-woven material was laid on the preheated highly porous graphene. The heat treatment process was carried out for 10 min with 100 g of weight in 7×7 $cm^2$ to firmly contact.

After the assembly of highly porous graphene with the non-woven material, The Cu—Ni alloy was dissolved away by floating the sample on a 0.5 M ammonium persulfate ((NH4)2S2O8, APS, 248614, Sigma Aldrich). The laminated non-woven/highly porous graphene was rinsed with a mixture of 5-10% ethanol and DI-water for 60 min to minimize the surface tension of water. The laminated sample was then dried at ambient condition.

Membrane Preparation for Measurement of Gas Flow Rate and Water Entry Pressure:

The assembly of highly porous graphene with the non-woven material was cut into small piece of around 1 cm×1 cm. A frame of 2 cm×2 cm for the assembled membrane was made of stainless steel with a hole of 2 mm at the center of the frame. The assembled membrane was laid on the metal foil including a small hole of 0.8 mm in diameter as a mechanical support. Afterward, the whole membrane was attached in carbon tape punched a hole in the middle on either side of the membrane and then sandwiched by the frame. Note that every hole needs to be aligned axially.

Gas Flow Rate Measurement:

The nitrogen gas permeance flow rate was characterized using a custom-built setup. The membrane described above was placed in a custom-made fixture and the sealing was achieved by utilizing rubber O-rings on both sides of the membrane. Nitrogen was issued to the feed side and pressure controlled by a regulator (SMC, IR1000-F01) with measurement of the pressure rise upstream by digital manometer (OMEGA, HHP91). A mass flow meter (MKS, Germany) measures the flow rate in sccm at the downstream. All the measurements were carried out at room temperature.

The assembly of highly porous graphene onto the non-woven material was fabricated by following the synthesis of highly porous graphene and the assembly of them described above. The highly porous graphene was synthesized on the catalyst where Ni film of 150 nm was deposited on top of commercial Cu foil by sputtering process and subsequently bi-layered Ni/Cu catalyst was annealed to transform into Cu—Ni alloy. The synthesis process of highly porous graphene having approximately 24% of porosity and 5-nm thick on the Cu—Ni alloy with thin film of W of 4 nm was carried out at 800° C. with the introduction of 40 sccm of $CH_4$, 40 sccm of $H_2$, and 300 sccm of Ar under 4 Torr for 30 min. In addition, the duration of the synthesis was adjusted from 30 to 60 min, leading to a decrease in porosity for the purpose of investigating how porosity of graphene affects gas flow rate. After the assembly of highly porous graphene with the non-woven material in the IPA-mediated method was performed, the metal catalyst was etched away by 0.5 M APS and was rinsed with the mixture of 5% ethanol and DI-water, following the dry process.

The membrane of highly porous graphene/non-woven material was mounted on the stainless-steel frame. The frame with the membrane was placed and clamped in the custom-made fixture which was connected to the gas line with the regulator and to the mass flow meter. Note that the mass flow meter is limited by 20 sccm of $N_2$. The pressure of $N_2$ was slowly and gradually increased. For example, the pressure of $N_2$ was increased in a step of 20 mbar and maintained for 1 min to stabilize the pressure until the mass flow meter showed 20 sccm of $N_2$.

Figure 25A:
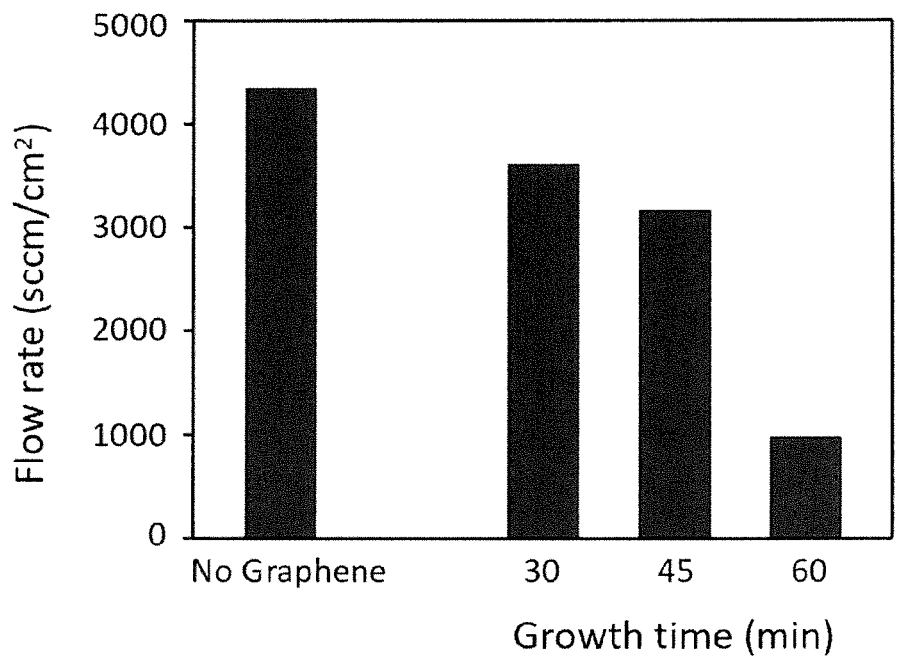
FIGS. 25a-25b show the $N_2$ flow rate of highly porous graphene on polyurethane as a function of (FIG. 25a) growth time and (FIG. 25b) pressure difference.
Figure 25B:
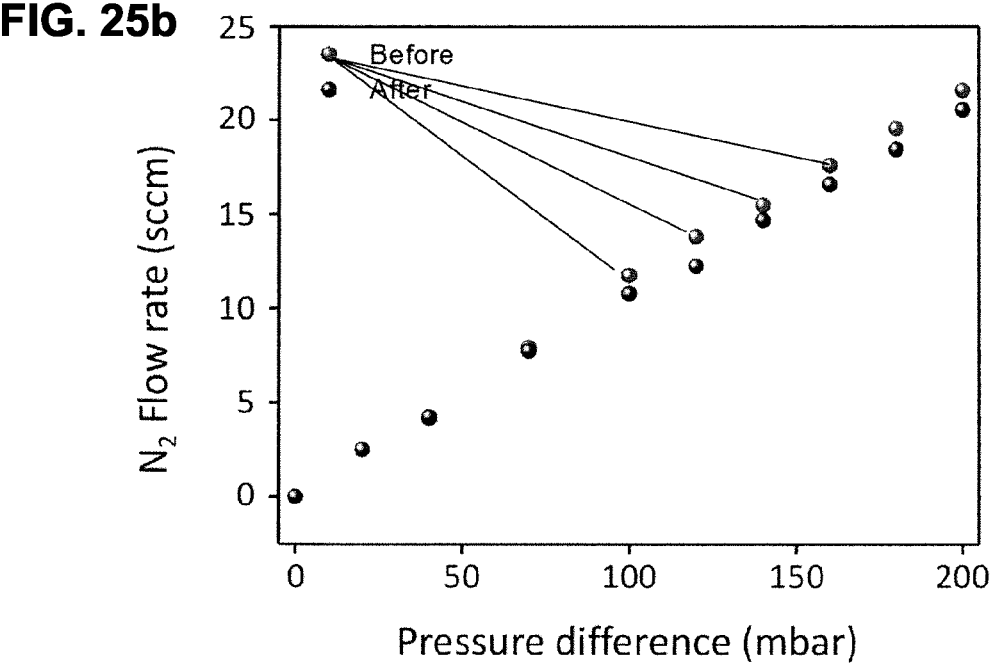

FIG. 25a is a gas flow rate of the highly porous graphene membranes as a function of growth time. The porous non-woven material itself showed 4351 sccm/cm², whereas for the highly porous graphene membrane grown for 30 min, the gas flow rate is decreased by 18%, corresponding to 3605 sccm/cm². As the duration of synthesis process increases, the gas flow rate is decreased down to 3160 and 971 sccm/cm², for 45-min and 60-min growth, respectively. In addition, FIG. 25b shows the gas flow rate of the highly porous graphene membrane before and after water entry pressure, which will be shown later. The highly porous graphene grown for 45 min was used. The gas flow rate was slightly reduced by 11%, corresponding to 2814 sccm/cm² due to partial blockage of pores while drying after the liquid measurement.

Water Entry Pressure Measurement (ISO 811, Hydrostatic Head Test):

The water entry pressure was characterized by a custom-built setup with distilled water. The whole membrane described above was inserted and firmly clamped in the fixture and the sealing was achieved by the rubber O-rings on both side of the membrane. A line was filled with DI-water by syringe. The upstream side of the line was connected to a $N_2$ gas line and downstream side of the line was connected to the fixture. The pressure of $N_2$ gas was controlled by the regulator (SMC, IR1000-F01) and monitored by digital manometer (OMEGA, HHP8200). As the pressure was built up, the pressure on the DI-water from feed side increased, resulting in a corresponding liquid contact pressure on the membrane surface. The pressure was gradually increased by the regulator and maintained at a pressure of interest for 30 min to investigate long-term stability. The pressure was increased until water droplet was observed from the back side. The pressure corresponding to water breakthrough is defined as the water entry pressure.

The assembly of the highly porous graphene onto the non-woven material was carried out in the same way described earlier for the gas flow measurement. The frame with the membrane was placed and clamped in the custom-made fixture which was connected to the water line. The opposite side of water line was connected to the $N_2$ gas line with the regulator. The pressure of $N_2$ was slowly and gradually increased. For example, the pressure of $N_2$ was increased in a step of 50 mbar and maintained for 1 min to stabilize the pressure until water droplet was observed behind the membrane.

FIG. 26a-c show representative SEM images of the highly porous graphene membrane before the water entry pressure measurement. The highly porous graphene was obtained on the binary metal alloy in which Ni film of 150 nm was coated on Cu foil by sputtering process and bi-layered Ni/Cu catalyst was subsequently annealed at 1000° C. to convert into the Cu—Ni alloy. After the deposition of W thin film (4 nm) on the Cu—Ni alloy, the synthesis process of highly porous graphene, in which the thin film of W was converted into W NSs during ramping up, was performed at 800° C. with 40 sccm of $CH_4$, 40 sccm of $H_2$, and 300 sccm of Ar under 4 Torr for 30 min, producing approximately 24% of porosity and 5-nm thick. At high magnification of SEM image in FIG. 26a, the highly porous graphene was transferred and mechanically supported by the non-woven material. In addition, porous structure of highly porous graphene was not affected while transferring and drying in FIG. 26 b and c. After the SEM investigation, the water entry pressure measurement was performed. The pressure of $N_2$ was gradually increased in a step of 50 mbar and maintained for 1 min, repeatably. When the pressure was reached at 3 bar which is corresponding to 30 meter of water column, the increasement of the pressure paused and maintained for 30 min to investigate the long-term stability. After 30 min, the pressure was decreased and the frame of the membrane was dried under ambient condition for the SEM inspection. FIG. 26 d-f show representative SEM images of the membrane after the water entry pressure measurement. FIG. 26 d indicates that, remarkably, the highly porous graphene over the non-woven material was not damaged at all. It was suggested that the highly porous graphene can withstand pressures of greater than 3 bar for 30 min, indicating a high water entry pressure resilience and long-term stability. Even though the highly porous graphene was survived well under 3 bar of pressure, FIG. 26 e and f indicate that the porous structure of graphene was partially blocked due to a clogging effect from contaminants during the test.

Influence of Ni Concentration on Areal Porosity and Thickness of Highly Porous Graphene:

Cu is the most widely used catalyst to synthesize high-quality monolayer graphene; however, its low catalytic effect causes prolonged growth duration and limited thickness (i.e., single layer). To expedite the growth process and control the thickness of graphene, other metals having a high catalytic effect can be added into Cu in the form of an alloy. Among other transition metals, Ni can build a binary metal alloy (i.e., Cu—Ni alloy), allowing enhancement of the growth reaction. Further, an engineered Cu—Ni alloy, meaning varied Ni concentrations, enables regulating the graphene growth mechanism from surface-mediated to precipitated behaviour. For example, under low Ni concentration of the Cu—Ni alloy, interpreting low C solubility, graphene growth takes place at the surface of the catalyst governed by a surface-mediated mechanism. In contrast, high Ni concentration is inclined to absorb C into the bulk of Cu—Ni alloy, and during the process of cooling down, C diffuses out from the bulk, facilitating the completion of multi-layer graphene growth (precipitated behaviour). Therefore, it is important to assess how the Ni concentration influences the structural characteristics (e.g., thickness and areal porosity) of highly porous graphene to find an optimal Ni concentration for the desired properties.

To analyse the dependence of Ni concentration of the Cu—Ni alloy on the thickness and areal porosity of highly porous graphene, a variable thickness of Ni film was applied on the Cu catalyst. Ni film of 10 nm, 25 nm, 50 nm, 100 nm, 150 nm, 300 nm, 1 µm, and 2.2 µm in thickness were deposited on the Cu catalyst using physical vapour deposition as described above.

The prepared catalysts were subjected to the annealing process to form Cu—Ni alloy. The annealing process was performed at 1000° C. under 50 sccm of $H_2$ for 1 hour. Ni concentrations obtained from each Ni thickness were in the range of 0.04% to 9% after annealing.

After the preparation of the Cu—Ni alloy with different Ni concentrations, a W thin film of 6 nm was coated on the alloys using physical vapour deposition. The growth of highly porous graphene was then carried out following the method mentioned above, briefly with 40 sccm of $CH_4$, 40 sccm of $H_2$, and 300 sccm of Ar at 750° C. under 4 Torr for 30 mins.

After the synthesis of highly porous graphene, the highly porous graphene was transferred onto a substrate, for example, $SiO_2$ or SiNx, to measure its thickness and areal porosity.

PMMA (950k, AR-P 672.03) as a protective layer was spin-coated on as-grown highly porous graphene with 4000 rpm for 40 secs, and then the Cu—Ni alloy was etched away by chemical solution (ammonium persulfate, 0.5 M) for 3 hours. The highly porous graphene with PMMA was then rinsed by deionized water for 30 mins and transferred onto the substrate. The PMMA film was removed by either acetone for 30 mins or thermal annealing at 400° C. for 2 hours.

Figure 27:
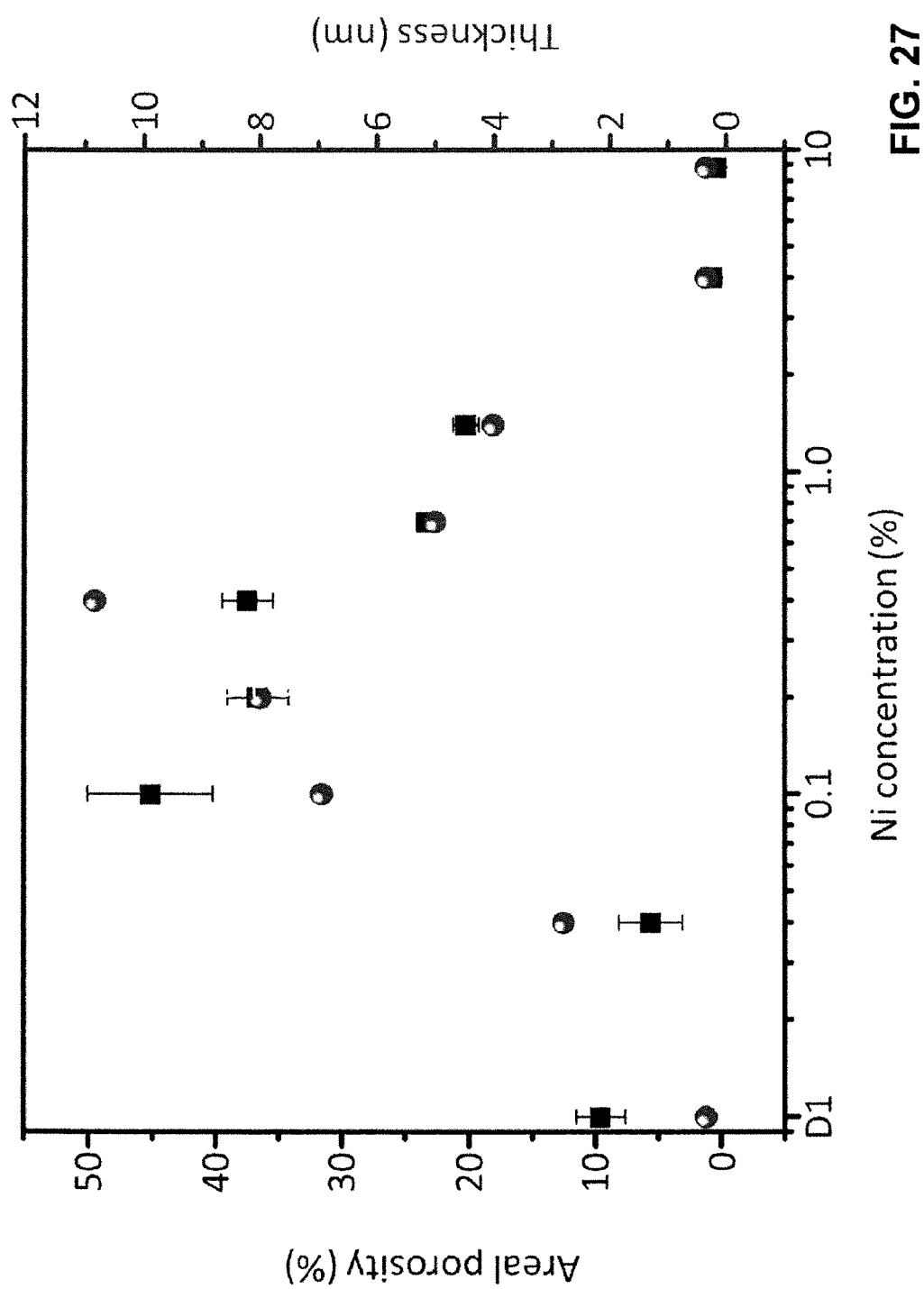
FIG. 27 shows a plot of areal porosity (squares) and thickness (circles) of highly porous graphene as a function of Ni concentration in the catalytically active substrate.

The thickness of each highly porous graphene transferred onto $SiO_2$ was measured by atomic force microscope (AFM). FIG. 27 shows a plot of the thickness of highly porous graphene as a function of the Ni content in the substrate.

For 0.04% of Ni concentration, the thickness of highly porous graphene is found to be 2.8 nm on average which corresponds to 8-9 layers. There is a quantum leap in the thickness of the graphene film from about 0.08% of Ni concentration, leading to 6.93 nm on average. It gradually increases until 0.4% of Ni concentration which provides the thickest film of the highly porous graphene as thick as 10.8 nm on average, corresponding to 32-33 layers. From 0.7% of Ni concentration, the thickness of highly porous graphene counterintuitively decreases to 5 nm on average, estimated to be 15 layers. Even thinner graphene of 4 nm on average, of about 12 graphene layers, was obtained with 1.4% of Ni concentration of Cu—Ni alloy. When even higher Ni concentrations such as 4 and 9% were utilized, a single layer of graphene which is 0.34 nm appears.

The result, based on the dependency on the Ni concentration, is the opposite of previous reports, in which it is reported that an as high as possible Ni concentration on Cu—Ni alloy facilitates the synthesis of multi-layer graphene. In our case, with increasing Ni concentration, as from 1%, highly porous graphene becomes thinner down to a single layer as from about 5% Ni content.

One can expect that given the utilization of identical thickness of W thin film, suggesting the same influence of W nanostructure on C flux at the surface, Ni concentration can manipulate the C flux as well.

In other words, the Cu—Ni alloy having high C solubility, originated from high Ni concentration, tends to absorb more active C species, and C concentration at the surface can be, therefore, diminished. The deficiency in C flux fails to satisfy the supersaturated state, preferably leading to C attachment to the pore edge rather than creating an additional graphene layer. As a result, the thickness of graphene is no longer thickened.

In addition to manipulating the C flux at the surface, Ni concentration has a significant impact on the evolution of W nanostructure. Due to the features of W such as high melting temperature and no solid solubility to Cu—Ni, when heated, W thin film was successfully converted into W nanostructures with linked nanowalls and lens-shape nanoparticles at low Ni concentration from 0.04 to 1.4%. However, with 4 and 9% of Ni concentrations, lens-shape nanoparticles of W appeared at the surface afterwards, instead of linked nanowalls. Since solid-state de-wetting of W thin film is influenced by the surface energy of the alloy, a different Ni concentration of the alloy, leading to a different surface energy, can vary the morphology of W nanostructures. As a result, huge difference in the morphology of W nanostructure occurred and Ni concentration can, therefore, affect the areal porosity of highly porous graphene.

The areal porosity is, generally in this document, calculated in detail as following; first, five representative SEM images of transferred highly porous graphene on the substrate were collected and a pore region was extracted using ImageJ program, typically said measurement pore region having an area of 4.6 $\mu m^2$.

Based on the result of extracted pore area, the areal porosity of highly porous graphene describes the fraction of pore space (empty space) in the highly porous graphene.

For 0.04% Ni concentration, although the W nanostructure appeared, areal porosity is 5.6%. Such low Ni concentration of Cu—Ni alloy can only produce a limited amount of active C species, thereby causing pore-edge attachment and low areal porosity.

With increasing Ni concentration from 0.1 to 1.4%, active C species were effectively supplied, enabling to reach the supersaturated state. Consequently, C atoms at the surface can initiate the growth of additional layer of graphene beneath the bottommost graphene layer rather than being attached to the edge of pore. As 0.1% of Ni concentration brought dense W nanostructure, the areal porosity is approximately 45.2%, which is the highest value. 0.2% and 0.4% of Ni concentration led to slightly decreased areal porosity of 36.7 and 38.4%, respectively, due to the morphology of W nanostructures.

From 0.7 and 1.4% of Ni concentration, areal porosity was found to be 23.3 and 20.3%, respectively. As it turned out that 4 and 9% of Ni concentration emerged W nanoparticles, areal porosity was significantly decreased to 0.7 and 0.4%, respectively.

To sum up, a plot of thickness and areal porosity of highly porous graphene as a function of Ni concentration is presented in FIG. 27, including those of porous graphene grown on bare Cu according to prior art WO2017212039 (D1).

It is concluded that Ni has an enormous effect on graphene growth behaviour and the morphology of W nanostructures.

Cu enclosure method has emerged W nanoparticles, leading to porous single-layer graphene. Poor catalytic activity of Cu does not produce enough concentration of C at the surface so that the thickness of graphene was restricted to single layer.

A small amount of Ni just in the right proportion as claimed helps converting the W thin film into a W nanostructure and rapidly decomposing $CH_4$ into active C species. Additionally, the low Ni concentration limits the diffusion of C into the bulk of Cu—Ni alloy, keeping high C flux at the surface to synthesize thick and high areal porosity of graphene.

In contrast, single-layer graphene with less than 1% of areal porosity grown on the Cu—Ni alloy having high Ni concentration appeared as a result of the transformation from W thin film to lens-shape of W nanoparticles and the bulk diffusion of active C species into the Cu—Ni alloy.

In this present invention, from 0.1 to 0.4% of Ni concentration allows for achieving the thickest film and highest areal porosity of graphene, suggesting that such Ni concentrations can not only promote the growth of an additional graphene layer but also evolve the W nanostructures to increase both of the thickness and areal porosity.

The invention claimed is:

1. A method for making a porous graphene layer of a thickness of 4-11 nm with pores having an average characteristic width in the range of 1-1000 nm, comprising the following steps:

providing a catalytically active substrate to catalyse the graphene formation under chemical vapour deposition conditions, said catalytically active substrate on its surface being provided with a plurality of catalytically inactive domains having a nanostructure essentially corresponding to the shape of the pores in the resultant porous graphene layer, wherein the catalytically active substrate is provided on its surface with the plurality of catalytically inactive domains by applying an essentially contiguous tungsten layer and by subsequently annealing at a pressure below normal pressure, to convert the tungsten film into the plurality of catalytically inactive domains;

chemical vapour deposition using a carbon source in the gas phase and formation of the porous graphene layer on the surface of the catalytically active substrate, the pores in the porous graphene layer being formed in situ due to the presence of the catalytically inactive domains;

wherein the catalytically active substrate is a copper-nickel alloy substrate with a copper content in the range of 98.6% by weight to 99.9% by weight and a nickel content in the range of 0.1% to 1.4% by weight, the copper and nickel contents complementing to 100% by weight of the catalytically active substrate, and wherein the porous graphene layer has an areal porosity in the range of 20% to 50%.

2. The method according to claim 1, wherein the catalytically active substrate has the nickel content in the range of 0.1%-1% by weight or 0.1-0.8% by weight complemented to 100% by weight by the copper content, or wherein the catalytically active substrate is prepared by applying a nickel film of a thickness in the range of 10 nm to 2.2 µm on a pure copper foil and by annealing.

3. The method according to claim 1, wherein the catalytically inactive domains have an average characteristic width in the range of 1-1000 nm.

4. The method according to claim 1, wherein chemical vapour deposition using a carbon source in the gas phase and formation of the porous graphene layer on the surface of the catalytically active substrate, the pores in the graphene layer in situ being formed due to the presence of the catalytically inactive domains is carried out using methane gas as carbon source.

5. The method according to claim 1, wherein the porous graphene layer is removed from the catalytic substrate, and applied to a porous supporting substrate.

6. The method according to claim 1, wherein prior to removal of the graphene layer, the layered structure of the catalytic substrate with the catalytically inactive domains and the graphene layer are subjected to a pre-leaching process weakening or removing the bond between the graphene layer and the catalytic substrate.

7. The method according to claim 1, wherein the graphene layer is removed using electrochemical methods, by immersing the layered structure of the catalytic substrate with the catalytically inactive domains and the graphene layer in an electrolyte and applying electrochemical potential to the substrate relative to a counterelectrode in the same electrolyte.

8. The method according to claim 1, wherein the graphene layer after or for removal from the catalytic substrate is attached to a porous nonwoven or fabric supporting substrate, wherein the nonwoven or fabric supporting substrate is attached to the graphene layer using solvent induced bonding and/or heat bonding.

9. The method according to claim 1, wherein the catalytically active substrate is prepared by applying, using electrochemical plating, e-beam evaporation, PVD or sputtering, a nickel film of a thickness in the range of 10 nm to 2.2 µm on a pure copper foil, having a thickness in the range of 0.01-0.10 mm, including copper foils having a purity of more than 99.5%, and by annealing at a temperature in the range of 800-1200° C. during a time span of 10 minutes-120 minutes.

10. The method according to claim 1, wherein the porous graphene layer has a thickness in the range of 5-11 nm.

11. The method according to claim 1, wherein the catalytically active substrate is provided on its surface with the plurality of catalytically inactive domains by applying, using sputtering, e-beam evaporation or PVD, the essentially contiguous tungsten layer, with a thickness in the range of more than 1 nm, and by subsequently annealing at less than 100 mTorr, including under a reducing atmosphere, in the presence of an inert gas including argon or nitrogen gas, combined with hydrogen gas, to convert the tungsten film into the plurality of catalytically inactive domains.

12. The method according to claim 11, wherein the annealing takes place at a temperature in the range of 700-1100° C. during a time span in the range of 10-180 minutes.

13. The method according to claim 1, wherein the catalytically inactive domains have an average characteristic width in the range of 10-100 nm.

14. The method according to claim 1, wherein chemical vapour deposition using a carbon source in the gas phase and formation of the porous graphene layer on the surface of the catalytically active substrate, the pores in the graphene layer in situ being formed due to the presence of the catalytically inactive domains is carried out using methane gas as carbon source, in the copresence of argon and hydrogen gas under reduced pressure, below 50 Torr during a time span of in the range of 10-120 minutes, wherein this graphene layer deposition process takes place during a time span allowing for the generation of a graphene layer of average thickness of more than 5 nm to 11 nm.

15. The method according to claim 1, wherein the porous graphene layer is removed from the catalytic substrate, and applied to a porous, nonwoven or fabric supporting substrate, in that for removal of the graphene layer first a carrier layer is applied to the graphene layer on the surface opposite to the catalytic substrate and the sandwich of this carrier layer is removed from the catalytic substrate.

16. The method according to claim 1, wherein prior to removal of the graphene layer, the layered structure of the catalytic substrate with the catalytically inactive domains and the graphene layer are subjected to a pre-leaching process weakening or removing the bond between the graphene layer and the catalytic substrate, wherein this pre-leaching step includes the formation of an oxide layer at least partially, or essentially completely between the graphene layer and the catalytic substrate and the removal of the catalytically inactive domains, or wherein the pre-leaching step is subjected to an acidic environment, in water, at a pH of less than 2.

17. The method according to claim 1, wherein prior to removal of the graphene layer, the layered structure of the catalytic substrate with the catalytically inactive domains and the graphene layer are subjected to a pre-leaching process weakening or removing the bond between the graphene layer and the catalytic substrate, wherein for the pre-leaching process an aqueous solution of 0.01-0.5 M NaOH is used, for a time span in the range of 10-60 minutes at a temperature in the range of 40-60° C., followed by rinsing with water and drying.

18. The method according to claim 1, wherein the graphene layer is removed, after a pre-leaching step, using electrochemical methods, by immersing the layered structure of the catalytic substrate with the catalytically inactive domains and the graphene layer in an electrolyte and applying electrochemical potential to the substrate relative to a counterelectrode in the same electrolyte.

19. The method according to claim 1, wherein the graphene layer after or for removal from the catalytic substrate is attached to a porous, nonwoven or fabric supporting substrate, having a characteristic filament diameter in the range of 200-2000 nm, or in the range of 300-1000 nm, or having a characteristic pore size in the range of 500-100050000 nm.

20. The method according to claim 19, wherein the nonwoven or fabric supporting substrate is attached to the graphene layer using solvent induced bonding and/or heat bonding.

21. The method according to claim 1, wherein the catalytically active substrate is provided on its surface with the plurality of catalytically inactive domains by applying, using sputtering, e-beam evaporation or PVD, the essentially contiguous tungsten layer, with a thickness in the range of more than 3 nm, and by subsequently annealing at less than 100 mTorr, including under a reducing atmosphere, in the presence of an inert gas including argon or nitrogen gas, combined with hydrogen gas, to convert the tungsten film into the plurality of catalytically inactive domains.

* * * * *